(12) United States Patent
Nakakubo et al.

(10) Patent No.: US 7,615,301 B2
(45) Date of Patent: Nov. 10, 2009

(54) FUEL BATTERY AND ELECTRIC DEVICE

(75) Inventors: Toru Nakakubo, Kawasaki (JP); Ken Eguchi, Yokohama (JP); Mitsuhiro Watanabe, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 436 days.

(21) Appl. No.: 10/497,700

(22) PCT Filed: Jun. 27, 2002

(86) PCT No.: PCT/JP02/06513

§ 371 (c)(1),
(2), (4) Date: Jun. 4, 2004

(87) PCT Pub. No.: WO03/049223

PCT Pub. Date: Jun. 12, 2003

(65) Prior Publication Data

US 2005/0008918 A1    Jan. 13, 2005

(30) Foreign Application Priority Data

Dec. 7, 2001  (JP) ............................. 2001-374174
Dec. 7, 2001  (JP) ............................. 2001-374175

(51) Int. Cl.
*H01M 2/02* (2006.01)
(52) U.S. Cl. .................. 429/34; 429/32; 429/38; 429/39
(58) Field of Classification Search .................... 429/32, 429/34, 38, 39, 12
See application file for complete search history.

(56) References Cited

U.S. PATENT DOCUMENTS

| 3,554,803 | A | 1/1971 | Poirier |
| 6,057,051 | A | 5/2000 | Uchida et al. ................. 429/19 |
| 6,600,157 | B2 | 7/2003 | Watanabe et al. ...... 250/370.08 |
| 2002/0074503 | A1 | 6/2002 | Watanabe ............. 250/370.08 |
| 2002/0146871 | A1 | 10/2002 | Watanabe et al. ........... 438/151 |
| 2003/0082421 | A1* | 5/2003 | Yonetsu et al. ................. 429/25 |

FOREIGN PATENT DOCUMENTS

| EP | 0 788 172 A1 | 8/1997 |
| EP | 0788172 | * 8/1997 |
| JP | 48-77341 | 10/1973 |
| JP | 62-226586 | 10/1987 |
| JP | 9-213359 | 8/1997 |
| JP | 2000-268836 | 9/2000 |
| JP | 2001-93561 | 4/2001 |
| JP | 2002-198072 | 7/2002 |

* cited by examiner

*Primary Examiner*—Raymond Alejandro
(74) *Attorney, Agent, or Firm*—Fitzpatrick, Cella, Harper & Scinto

(57) ABSTRACT

A fuel cell system, which is mounted and used for a portable and small electric device, comprises a cell unit (1) comprising one or more fuel cells (14), a fuel tank unit (3) for storing a fuel to be supplied to the cell unit (1), a fuel feed unit (4) for supplying the fuel of the fuel tank unit (3) to the cell unit (1), and an opening (7) for supplying an oxidizer gas to the cell unit (1), in a thin housing (2) having a substantially rectangular parallelepiped shape, wherein the fuel tank unit (3), fuel feed unit (4) and cell unit (1) are located in one direction between two opposite short side faces (83*a*, 83*b*) of the housing (2). A large-capacity and high-output small fuel cell system is provided by such a structure.

12 Claims, 31 Drawing Sheets

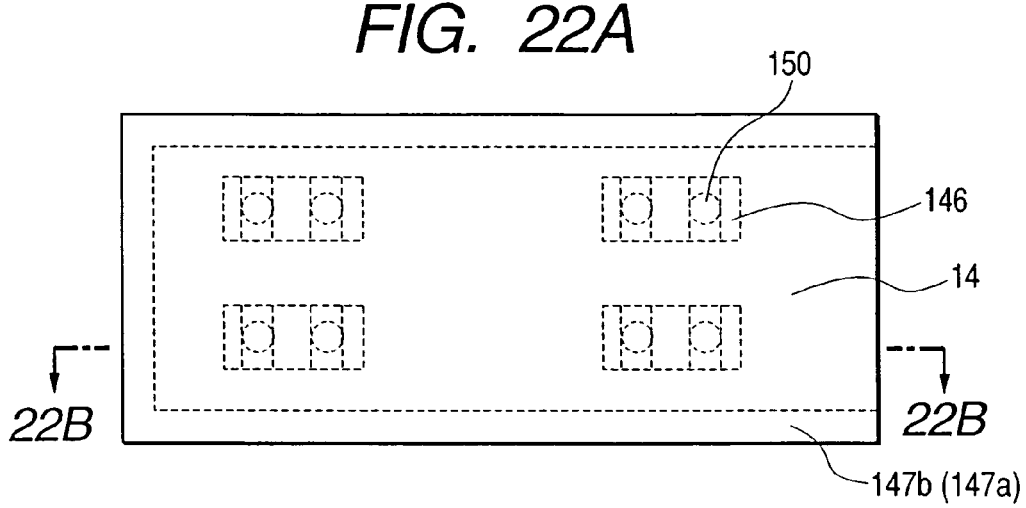
FIG. 22A
FIG. 22B
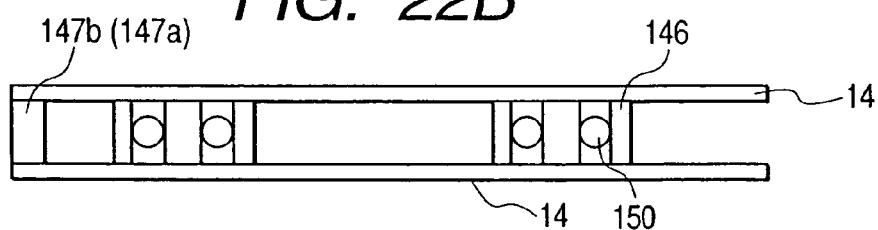
FIG. 23A
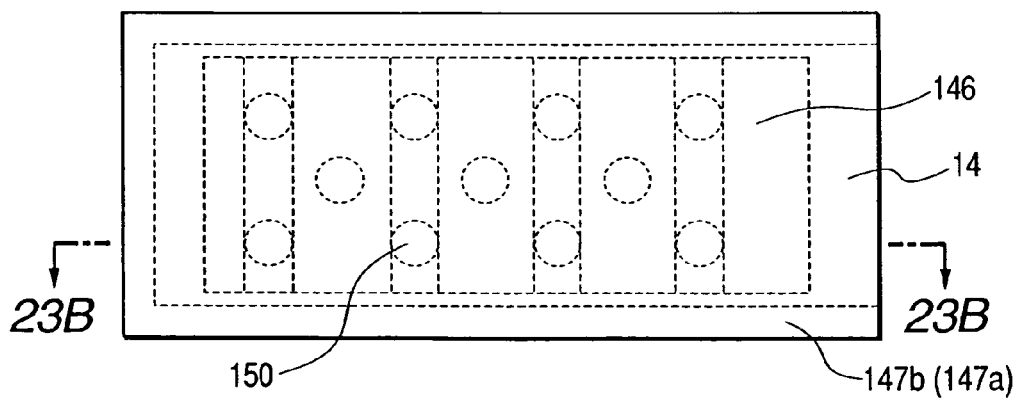
FIG. 23B
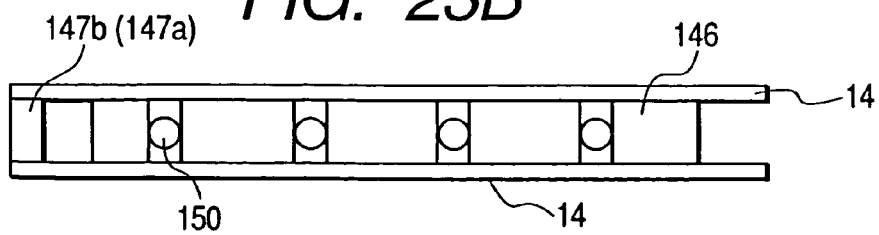

FUEL BATTERY AND ELECTRIC DEVICE

TECHNICAL FIELD

The present invention relates to a fuel cell system and an electric device.

BACKGROUND ART

Until now, in order to carry and use a small electric device, various primary and secondary batteries have been used. However, the power consumption of recent small electric devices has increased due to their high performances, and therefore, it has become impossible for small and lightweight primary batteries to supply a sufficient amount of energy. On the other hand, although there is an advantage in using a secondary battery in that it can be recharged, usable energy upon one recharge is even less than that of a primary battery. Furthermore, not only another power source is necessary for charging a secondary battery, but also charging usually takes several tens of minutes to several hours, and it is difficult to make it possible to always use it immediately anywhere.

Furthermore, the tendency to carry and use the electric devices has increased with the advent of a wireless network environment, requiring even a further reduction in the size and weight of these devices. Hence, it is difficult for conventional primary and secondary batteries to supply sufficient energy for driving such devices.

As a solution to this problem, small fuel cells have attracted attention. Until now, fuel cells have been developed as driving sources of large-sized dynamos and automobiles. This is mainly because fuel cells have high generating efficiencies in comparison with conventional power generation systems, and moreover, their byproducts are clean. On the other hand, a reason why a fuel cell system may be useful as a driving source of a small electric device is that an energy amount per volume or per weight that can be supplied by the fuel cell is several times to tens of times that of a conventional battery. Furthermore, since it is possible to continuously use a fuel cell so long as the fuel is replaced, there is no charging period as with secondary cells.

Although various types of fuel cells have been invented, for example, polymer electrolyte fuel cells are suitable for a small electric device, and in particular, a portable device which is carried and used. This is because these fuel cells can be used at near room temperature, and in addition, since their electrolyte is not a liquid but a solid, they have an advantage in that they can be safely carried.

Methanol has been studied as a fuel for the fuel cell system for a small electric device. This is mainly because methanol is a fuel that can be easily stocked and acquired.

It is best to use hydrogen as fuel in the fuel cells for obtaining a large output. However, hydrogen is a gas at room temperature and it was very difficult to store hydrogen in a small fuel tank at a high density.

One conventional hydrogen storage method involves compressing and saving hydrogen as a high pressure gas. However, the volume hydrogen density is about 18 mg/cm$^3$ even if gas pressure is increased to 20 MPa (about 200 atmospheres).

A second method of storing hydrogen involves keeping it at a low temperature as a liquid.

A third method is a method of storing hydrogen by using a hydrogen storing metal alloy. According to this method, the occlusion amount per volume is large.

A fourth method involves loading methanol, gasoline, or the like, in a fuel tank and converting it into hydrogen for use.

A fifth method is a method of using a carbon-based material, such as a carbon nanotube, a graphite nanofiber, or a carbon nanohorn. These carbon-based materials can occlude hydrogen at about 10% by weight. Accordingly, when the fuel cell is used as a power source in a digital camera, it is possible to take about 3 to 5 times more photographs than in the case of using a conventional lithium ion battery.

In addition, a sixth method is a method of using a chemical hydride. The chemical hydride is a compound that occludes and releases hydrogen by using a chemical reaction. There are various organic materials and inorganic materials that can be broadly classified as chemical hydrides. An example of an inorganic chemical hydride is a boro hydride. Organic chemical hydrides may be, for example, cyclohexane, decalin and the like. These compounds can occlude about 5 to 10% by weight of hydrogen.

In addition, although a cell unit of a fuel cell system comprises at least one fuel cell, an amount of power generation of about 5V is usually needed so as to drive a mobile device. Since the amount of power that can be generated by one cell is about 1V at the maximum, it is necessary to connect a plurality of cells in series in order to obtain the needed amount of voltage.

The above-described fuel cell system comprises respective units, such as a cell unit comprising one or more fuel cells, a fuel tank unit for storing a fuel, a fuel feed unit for supplying the fuel of the fuel tank unit to the cell unit, an opening for supplying an oxidizer gas to the cell unit, and a wiring unit for collecting a generated power. However, in such a structure of the above-described respective units of the fuel cell system, the shape of a fuel cell system for mounting in a small electric device, the structure of arrangement of respective units in the battery, and in particular, the structure of arrangement of respective units necessary for miniaturization were not taken into consideration.

In order to efficiently arrange a plurality of fuel cells, until now, a method of stacking, in turn, an MEA (Membrane Electrode Assembly) comprising an electrode and a polymer electrolyte membrane, and a separator in which a fuel flow path is located on the side of the partition wall of the fuel, has been adopted. In addition, the cells stacked were electrically connected in series by producing the separators with conductive materials.

This embodiment is shown in FIG. 12. FIG. 12 is a schematic sectional view showing the structure of respective fuel cells stacked in a conventional fuel cell system. As shown in this figure, a cell unit 1 of a fuel cell system comprises one or more fuel cells 14, and one fuel cell 14 has an oxidizer electrode 11 in one face, a fuel electrode 13 in another face, and is provided with an oxidizer flow path 44 for taking in air on the side of the oxidizer electrode 11 and a fuel flow path 43 for supplying fuel on the side of the fuel electrode 13. The fuel cell system is formed by stacking the above-described one fuel cell as a constitutional unit with interposition of a separator 45 between the fuel cells. Thus, respective separators 45, which separate fuel cells, are provided between each adjacent fuel flow path 43 and oxidizer flow path 44 of the stacked fuel cells. In addition, for each fuel cell 14, the oxidizer flow path 44 and fuel flow path 43 are independently provided, respectively, and three separators 45 are provided for four sheets of fuel cells 14. Therefore, since the thickness of the entire fuel cell system is the sum of the thicknesses of the fuel cells, oxidizer flow paths, fuel flow paths, and separators, there is a problem in that the size of the fuel cell system becomes large with respect to its capacity to generate electric power.

Moreover, regarding the size of a fuel cell system, as a miniaturization method of the fuel cell system, in "Planar Interconnection of Multiple Polymer Electrolyte Membrane Fuel Cells by Microfabrication" presented by F. B. Prinz et al. in the 2001 Joint International Meeting, "the 200th meeting of The Electrochemical Society Inc. and the 52nd Annual Meeting of the International Society of Electrochemistry" held in September, 2001, a method of locating a plurality of fuel cells on the same plane was also attempted. In this case, so as to collect the electricity generated in the cells, a method of using three-dimensional wiring, etc., and performing serial wiring was adopted.

However, in such a configuration, the structure for mounting in a small electric device and the structure necessary for miniaturization were not taken into consideration. In particular, a stacking method of fuel cells in a conventional fuel cell system had a defect in that fuel could not be efficiently supplied to the cells since the fuel flow paths became narrow when the fuel cells had a small volume and the number of stacks increased.

Moreover, the method of placing a plurality of fuel cells on the same plane, and connecting them in series using three-dimensional wiring, etc., required holes in the cells for sending the electric current, destroying the sealing performance of fuel chambers.

DISCLOSURE OF THE INVENTION

The present invention solves these problems individually or altogether.

That is, a first aspect in accordance with the present invention has been made so as to improve such technical problems as described above, individually or altogether, and in consideration of an arrangement relationship of respective units constituting a fuel cell system. In particular, the object of this aspect is not only to find the optimal arrangement for miniaturization, but also to provide a large-capacity, high-output, and small-size fuel cell system, and an electric device using it.

Namely, the first aspect in accordance with the present invention is a fuel cell system which is mounted in and used for a portable and small electric device, comprising, in a thin housing having a substantially rectangular parallelepiped shape, a cell unit comprising one or more fuel cells, a fuel tank unit for storing a fuel to be supplied to the cell unit, and a fuel feed unit for supplying the fuel of the fuel tank unit to the cell unit, wherein the above-mentioned fuel tank unit, fuel feed unit, and cell unit are located in one direction between two opposite faces of the housing.

Regarding the first preferable arrangement in the fuel cell system of the present invention, it is preferable that the above-mentioned fuel tank unit, fuel feed unit, and cell unit are located in one direction between two opposite side faces of the housing.

In addition, it is preferable that the above-mentioned fuel tank unit, fuel feed unit and cell unit are located in this order between the two opposite side faces.

Moreover, it is preferable that one or more fuel cells of the above-mentioned cell unit are stacked and located so as to be parallel to the bottom face of the housing.

Regarding a second preferable arrangement in a fuel cell system of the present invention, it is preferable that the above-mentioned fuel tank unit, fuel feed unit and cell unit are located in one direction between a top face and a bottom face of the housing, which face each other.

Moreover, it is preferable that the above-mentioned cell unit faces and is located parallel to at least one of a top face and a bottom face of the housing.

In addition, it is preferable that the above-mentioned cell unit, fuel feed unit, fuel tank unit, another fuel feed unit, and another cell unit are located in this order between the top face and the bottom face.

In the fuel cell system of the present invention, it is preferable that above-mentioned housing has an opening for supplying an oxidizer gas, and the opening is provided in at least a portion of the housing where a cell unit exists. In particular, it is preferable that the above-mentioned opening is provided in the top face, bottom face and side face of the housing.

Furthermore, it is preferable that the fuel cell system further comprises a wiring unit for supplying the power obtained by collecting the generated power to an external device, with the wiring unit provided at a location where the fuel tank unit does not exist.

It is preferable that the above-mentioned fuel tank unit is provided detachably from the housing.

It is preferable that the above-mentioned fuel cell system is a polymer electrolyte small fuel cell system.

A second aspect in accordance with the present invention solves the technical problems described above, individually or altogether, miniaturizes and simplifies each component of a fuel cell system, and avoids the use of unnecessary control and drive units. Specifically, another object of the present invention is to provide a small fuel cell system, which does not use conventional separators, decreases the number of oxidizer flow paths and fuel flow paths for a fuel cell, efficiently supplies fuel to a fuel cell by broadening a fuel flow path, and compactly integrates a plurality of fuel cells, and electric device using it.

Namely, the second aspect in accordance with the present invention is a fuel cell system comprising a fuel cell A having a fuel electrode on one face and having an oxidizer electrode on another face, and a fuel cell B having an oxidizer electrode on one face and having a fuel electrode on another face, wherein the fuel electrodes of the fuel cells A and B face each other or the oxidizer electrodes of the fuel cells A and B face each other, and a common fuel flow path is provided between the fuel electrodes of the above-mentioned fuel cells A and B, which face each other, or a common oxidizer flow path is provided between the oxidizer electrodes, which face each other.

The fuel cell system of the present invention comprises a number of at least one of the above-mentioned fuel cell A and the above-mentioned fuel cell B, wherein the above-mentioned fuel cell(s) A and the above-mentioned fuel cell(s) B are provided, in turn, so that at least one kind of the fuel electrodes and the oxidizer electrodes of the fuel cells A and B face each other, and wherein at least one of a common fuel flow path between the fuel electrodes of the above-mentioned fuel cells A and B which face each other, and a common oxidizer flow path between the oxidizer electrodes which face each other is provided.

It is preferable that there is at least one of each of the above-mentioned fuel cell A and fuel cell B, that the fuel cell(s) A and fuel cell(s) B have the same structure, and that the fuel cells are stacked, in turn, and provided so that the fuel electrodes face each other and the oxidizer electrodes face each other by reversing one kind of the fuel cells.

It is preferable that a supporting member is provided in the oxidizer flow path so as to suppress the transformation of the fuel cell by the differential pressure between an oxidizer in the above-mentioned oxidizer flow path and a fuel in the fuel flow path.

It is preferable that the above-mentioned supporting member is made of a porous material.

It is preferable that the fuel cell system further comprises a wiring unit for transferring the power generated by the above-mentioned respective fuel cells and collecting the power in a portion not in contact with fuel.

It is preferable that the above-mentioned wiring unit is provided in a vertical direction to a face of the fuel cell on the outside of the fuel cell.

It is preferable that an electrode for transporting the power of the fuel cell system to the outside of the battery is provided in contact with the above-mentioned wiring unit.

A third aspect of the present invention is a fuel cell system comprising a plurality of fuel cells each having a fuel electrode on one face and an oxidizer electrode on another face; a plurality of collector members, each provided between the plurality of above-mentioned fuel cells and in contact with the fuel electrodes and oxidizer electrodes of the plurality of above-mentioned fuel cells, for taking out power from each of the plurality of above-mentioned fuel cells; and insulating members each provided between the plurality of above-mentioned collector members, for insulating adjacent collecting electrodes from each other, wherein the plurality of above-mentioned fuel cells are provided so that the fuel electrodes or the oxidizer electrode of adjacent fuel cells face each other, and a common fuel flow path is provided between the fuel electrodes which face each other when the fuel electrodes face each other, or a common oxidizer flow path is provided between the oxidizer electrodes which face each other when the oxidizer electrodes face each other, and that the plurality of above-mentioned fuel cells, and the plurality of above-mentioned collecting electrodes and the above-mentioned insulating members are stacked.

It is preferable that each of the plurality of above-mentioned collector members has a plate-like shape.

It is preferable that each of the plurality of above-mentioned collector members has air permeability.

It is preferable that each of the plurality of above-mentioned collector members has air vents.

It is preferable that there are two kinds of A and B in the plurality of above-mentioned collector members, and that the collecting electrode A is a collecting electrode having a power takeoff part at its end which is shifted from the center of the collector member A, and the collecting electrode B is a collecting electrode having an electrode takeoff part at its end which is shifted in a reverse direction to the shift of the power takeoff part of the collecting electrode A.

It is preferable that the plurality of above-mentioned collecting electrodes are provided so that the collecting electrode A is provided in contact with the oxidizer electrode and the collecting electrode B is provided in contact with the fuel electrode.

It is preferable that the plurality of the above-mentioned collecting electrodes are provided so that collecting electrodes A and B are provided in turn.

It is preferable that the fuel cell system further comprises a circuit board electrically connecting the plurality of the above-mentioned collecting electrodes to each other, and the plurality of above-mentioned fuel cells are mutually electrically connected by each electrode takeoff part of the plurality of above-mentioned collecting electrodes to the above-mentioned circuit board.

It is preferable that an insulating member provided between the oxidizer electrode among the above-mentioned insulating members is a supporting member, and that an insulating member provided between fuel electrodes is a partition wall, which isolates a fuel electrode chamber from the outside.

A fourth aspect of the present invention comprises a plurality of fuel cells each having a fuel electrode on one face and an oxidizer electrode on another face; conductive supporting members, each protruding from an end of the fuel cells and in contact with the above-mentioned oxidizer electrode; and conductive partition walls, each provided between fuel cells with protruding from an end of the fuel cell and provided in contact with the above-mentioned fuel electrode, for isolating a fuel electrode chamber from its external space, wherein the plurality of above-mentioned fuel cells are provided so that the oxidizer electrode or the fuel electrodes of adjacent fuel cells face each other, a common fuel flow path is provided between the fuel electrodes which face each other when the fuel electrodes face each other, or a common oxidizer flow path is provided between the oxidizer electrodes which face each other when the oxidizer electrodes face each other, wherein the plurality of above-mentioned fuel cells, the above-mentioned supporting member, and the above-mentioned partition wall are stacked, and wherein power generated by each of the plurality of above-mentioned fuel cells is taken out through the above-mentioned supporting member and the above-mentioned partition wall.

It is preferable that the fuel cell system further comprises another supporting member and the another supporting member is provided in contact with and between the plurality of above-mentioned fuel cells.

It is preferable that the above-mentioned another supporting member has electroconductivity.

A fifth aspect in accordance with the present invention comprises a plurality of fuel cells, each having a fuel electrode on one face and an oxidizer electrode on another face; an insulating supporting member protruding from an end of the fuel cell and provided at the above-mentioned oxidizer electrode through a conductive member; an insulating partition wall provided between the fuel cells with protruding from an end of the fuel cell and provided at the above-mentioned fuel electrode through a conductive member, for isolating a fuel electrode chamber from the external space, wherein the plurality of above-mentioned fuel cells are provided so that the oxidizer electrode or the fuel electrodes of adjacent fuel cells face each other, a common fuel flow path is provided between the fuel electrodes which face each other when the fuel electrodes face each other, or a common oxidizer flow path is provided between the oxidizer electrodes which face each other when the oxidizer electrodes face each other, wherein the plurality of above-mentioned fuel cells, the above-mentioned supporting member and the above-mentioned partition wall are stacked, wherein adjacent fuel cells are mutually insulated electrically by the supporting member and the partition wall, wherein the above-mentioned conductive member is provided with protruding from an end of the fuel cell, and wherein a power generated by each of the plurality of above-mentioned fuel cells is taken out through the above-mentioned conductive member.

It is preferable that the above-mentioned another supporting member has an insulating property.

It is preferable that the fuel cell system further comprises a water shutoff member for preventing the flow of water, and the water shutoff member is provided between the oxidizer electrodes, for preventing water from contacting both oxidizer electrodes that face each other.

It is preferable that the above-mentioned fuel cell system is a polymer electrolyte fuel cell system.

Moreover, another aspect of the present invention is an electric device using the fuel cell system according to the first or second aspects described above.

In addition, other features and effects of the present invention are described below in detail by referring to the drawings.

BRIEF DESCRIPTION OF THE DRAWINGS

FIG. 22A is a plan view of two cells and supporting members which support them and have air vents;

FIG. 22B is an end view along the 22B-22B line of FIG. 22A;

FIG. 23A is a plan view of two cells and supporting members which support them and have air vents;

FIG. 23B is an end view along the 23B-23B line of FIG. 23A;

BEST MODE FOR CARRYING OUT THE INVENTION

Figure 1:
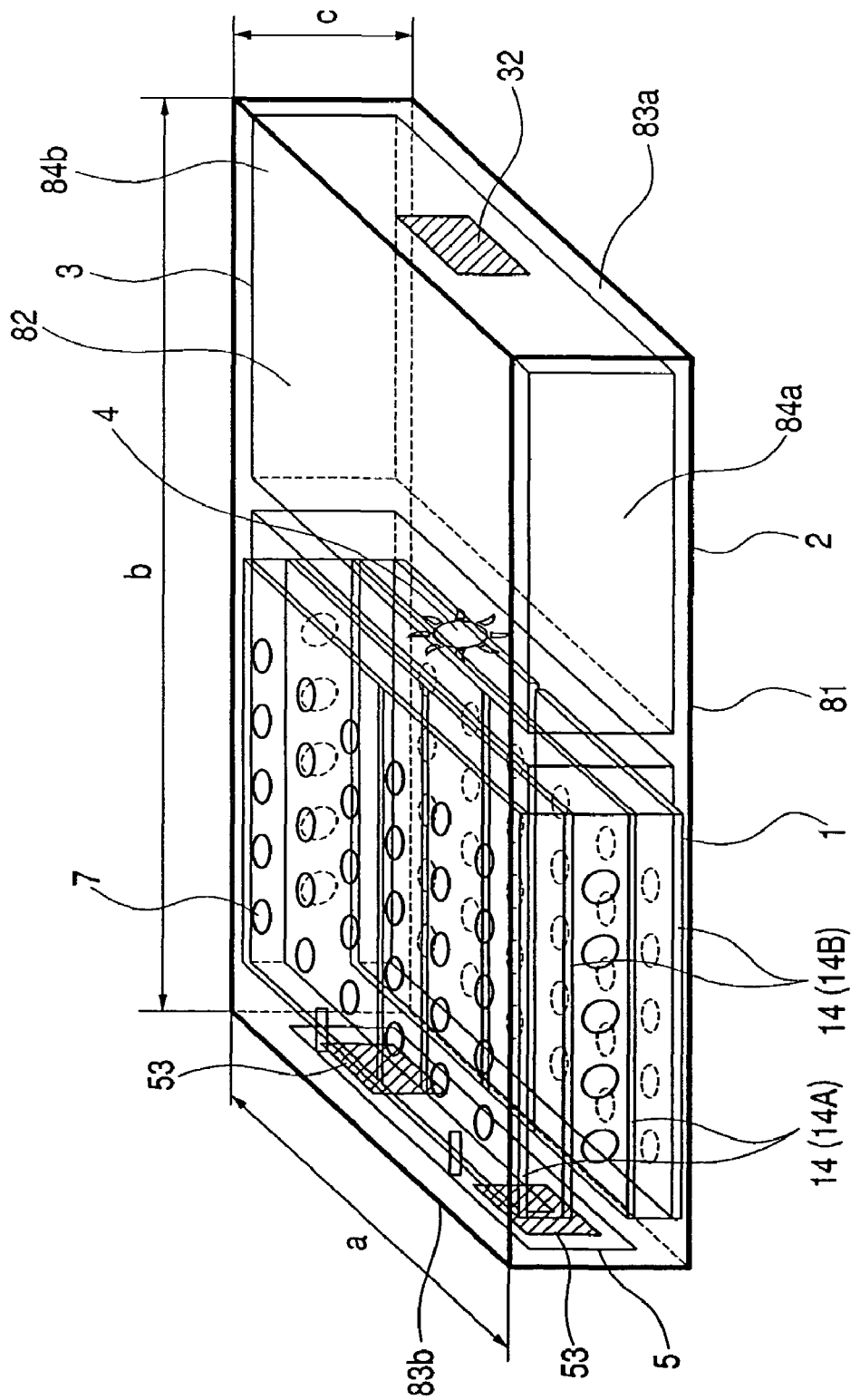
FIG. 1 is a perspective view showing an example of a fuel cell system of the present invention.

Hereafter, the present invention will be explained in detail referring to the following embodiments.

First Embodiment

A fuel cell system of this embodiment according to a first aspect of the present invention is a fuel cell system which is mounted in and used for a portable and small electric device, such as a digital camera, a digital video camera and a printer, comprising a cell unit comprising one or more fuel cells, a fuel tank unit for storing a fuel to be supplied to the cell unit, a fuel feed unit for supplying a fuel of the fuel tank unit to the cell unit, and an opening for supplying an oxidizer gas to the cell unit, in a thin housing with a substantially rectangular parallelepiped shape, wherein the above-mentioned fuel tank unit, fuel feed unit, and cell unit are located in one direction between two opposite faces of the housing.

That is, in the fuel cell system of this embodiment, an unnecessary space is removed by locating the fuel tank unit, the fuel feed unit and the cell unit in one direction in the thin housing having a substantially rectangular parallelepiped shape. These components are contained in the housing so as to obtain a large capacity and a high output.

In the fuel cell system of this embodiment, it is preferable that a fuel to be supplied to the fuel tank is hydrogen so as to provide a sufficient amount of power to drive a small electric device, and to use, for example, a carbon-based material so as to store the fuel in the fuel tank at a high density. As the carbon-based material, a carbon nanotube, a graphite nanofiber, or a carbon nanohorn is used. In this case, since the pressure in the fuel tank reaches several tens of atmospheres, the thickness of the fuel tank is required to be 1 to 2 mm for safety. When producing a thin fuel cell system, it is not possible to provide a fuel tank of sufficient capacity unless it is possible to sufficiently secure the depth of the fuel tank. It is possible to secure the depth of the fuel tank by locating the cell unit, the fuel feed unit and the fuel tank unit, for example, along a top face and a bottom face of the housing flatly in series in one direction inside the housing.

Moreover, in order to obtain a sufficient output from the fuel cell system, it is necessary to secure the surface areas of the fuel cells of the cell unit. In addition, although open air is taken in from the opening of the air vent as an oxidizer in the fuel cell system of the present invention, it is necessary that sufficient open air is supplied to the fuel cells so as to generate electricity efficiently. In the present invention, in order to secure the sufficient areas of the fuel cells and to supply the oxidizer efficiently, it is preferable to locate the fuel cells parallel to the top face and bottom face of the housing, to provide openings for taking in the open air at least in the top face and bottom face of the housing, and also to provide openings in side faces of the housing, if necessary.

Furthermore, for the convenience of taking out the generated electricity, there is no electrode for supplying a power to the outside, on a fuel tank unit side in view of the cell unit.

Moreover, in the structure of this embodiment, it is also possible to make the fuel tank detachable from the fuel cell system.

Hereafter, although the present invention will be further explained in detail according to examples of small fuel cells, the present invention is not limited to a small fuel cell system.

Example 1

This example will be specifically explained below on the basis of the drawings.

Figure 2A:
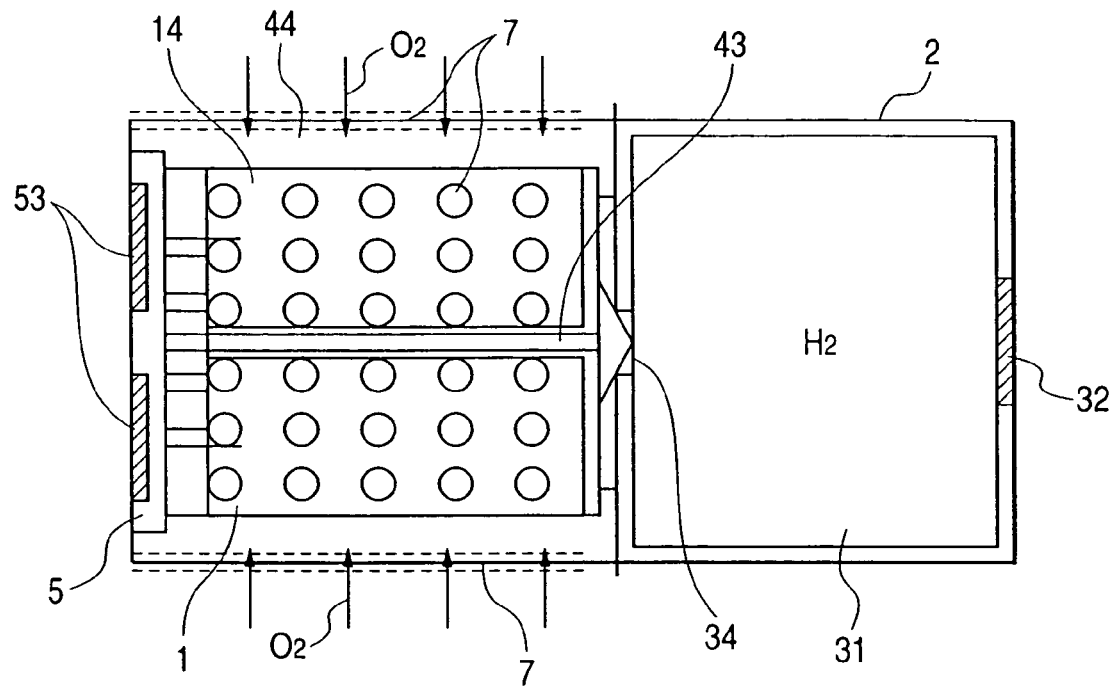
FIG. 2A is a plan view of the fuel cell system in FIG. 1.
Figure 2B:
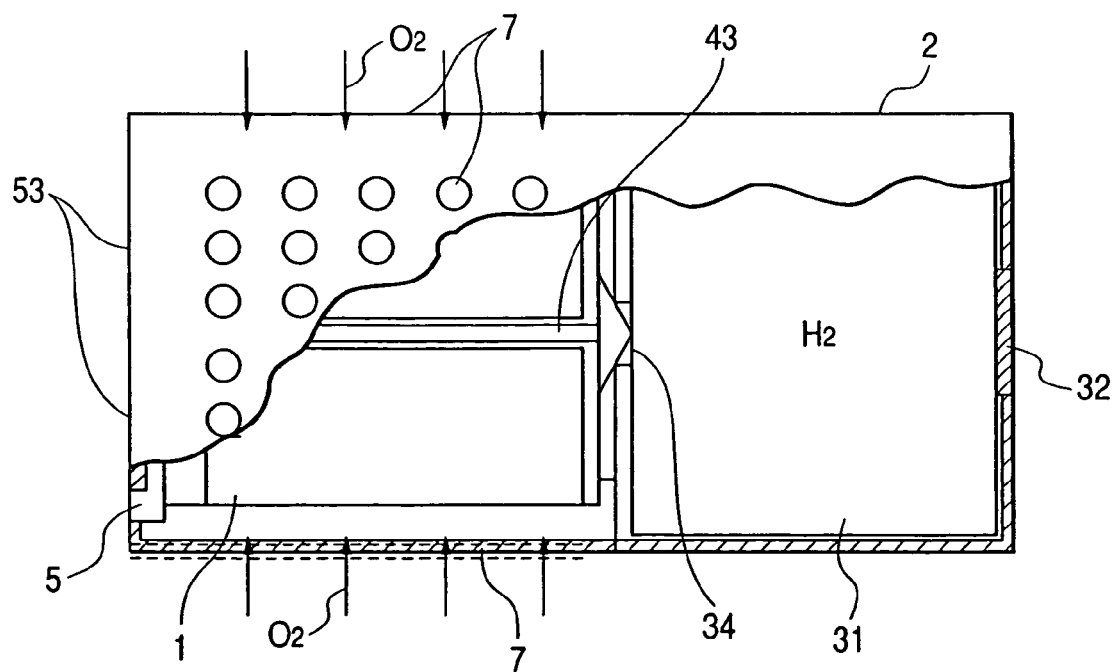
FIG. 2B is a partial sectional plan view of the fuel cell system in FIG. 1.
Figure 3A:
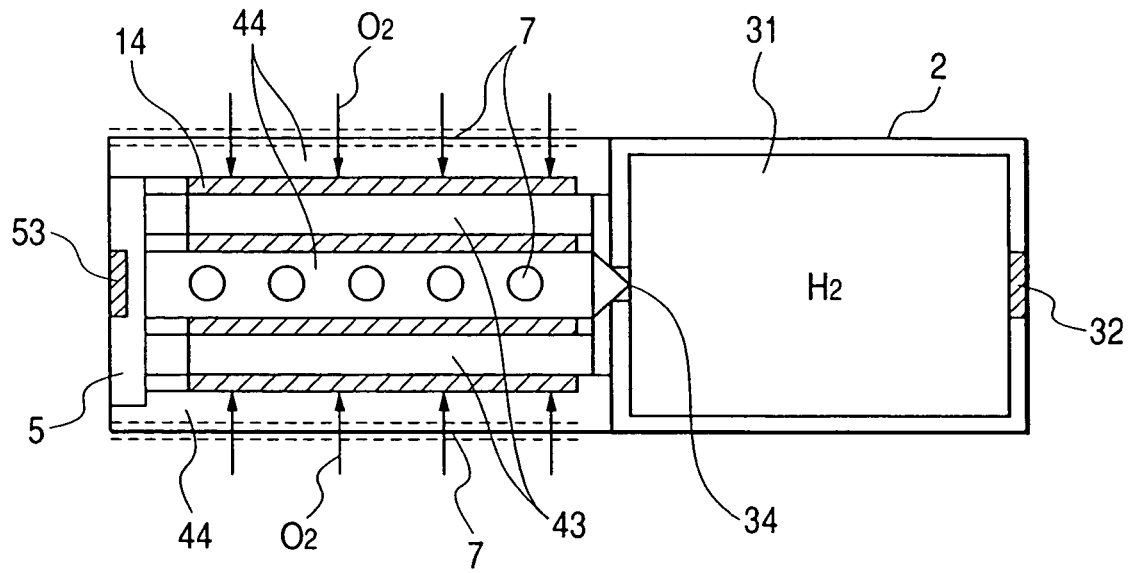
FIG. 3A is a front view of the fuel cell system of the first invention according to this application.
Figure 3B:
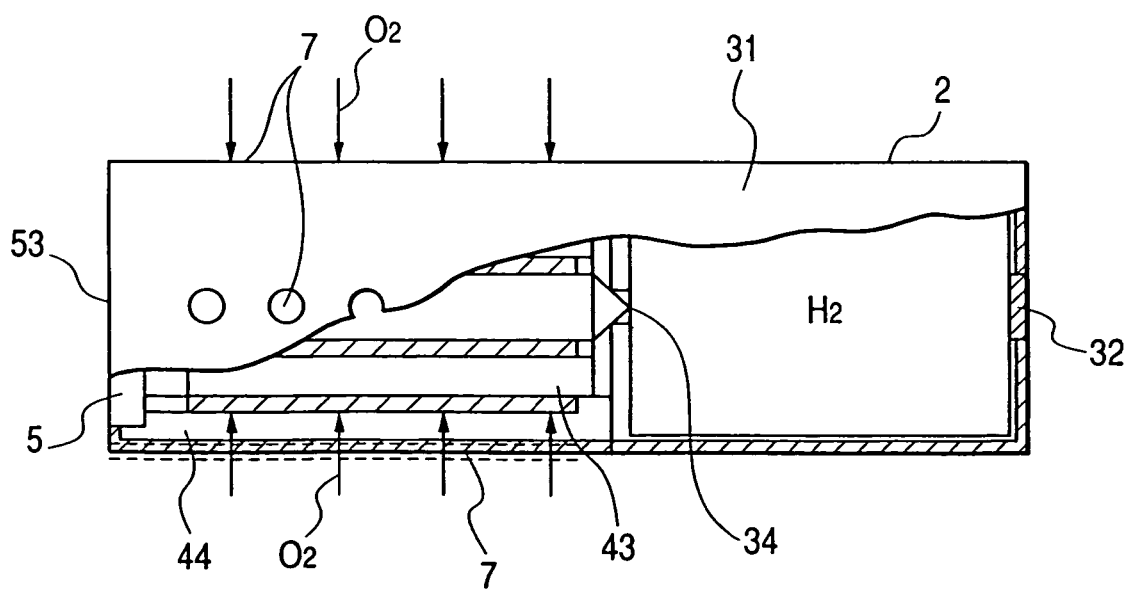
FIG. 3B is a partial sectional front view of the fuel cell system of the first invention according to this application.
Figure 4:
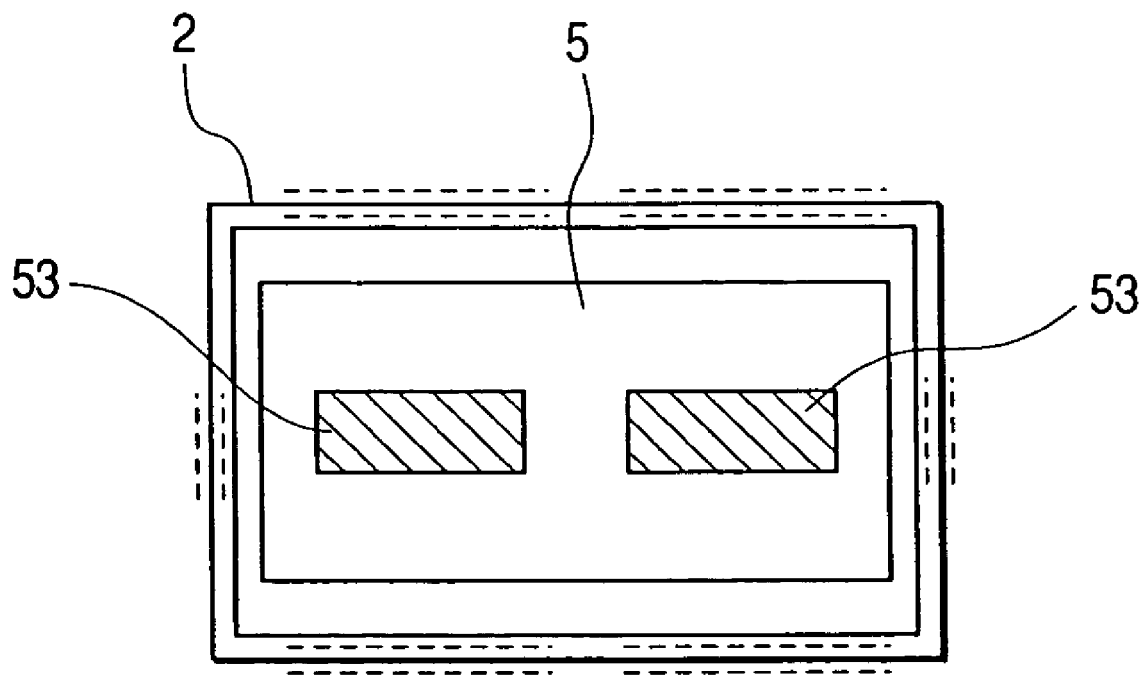
FIG. 4 is a left side view of the fuel cell system in FIG. 1.
Figure 5:
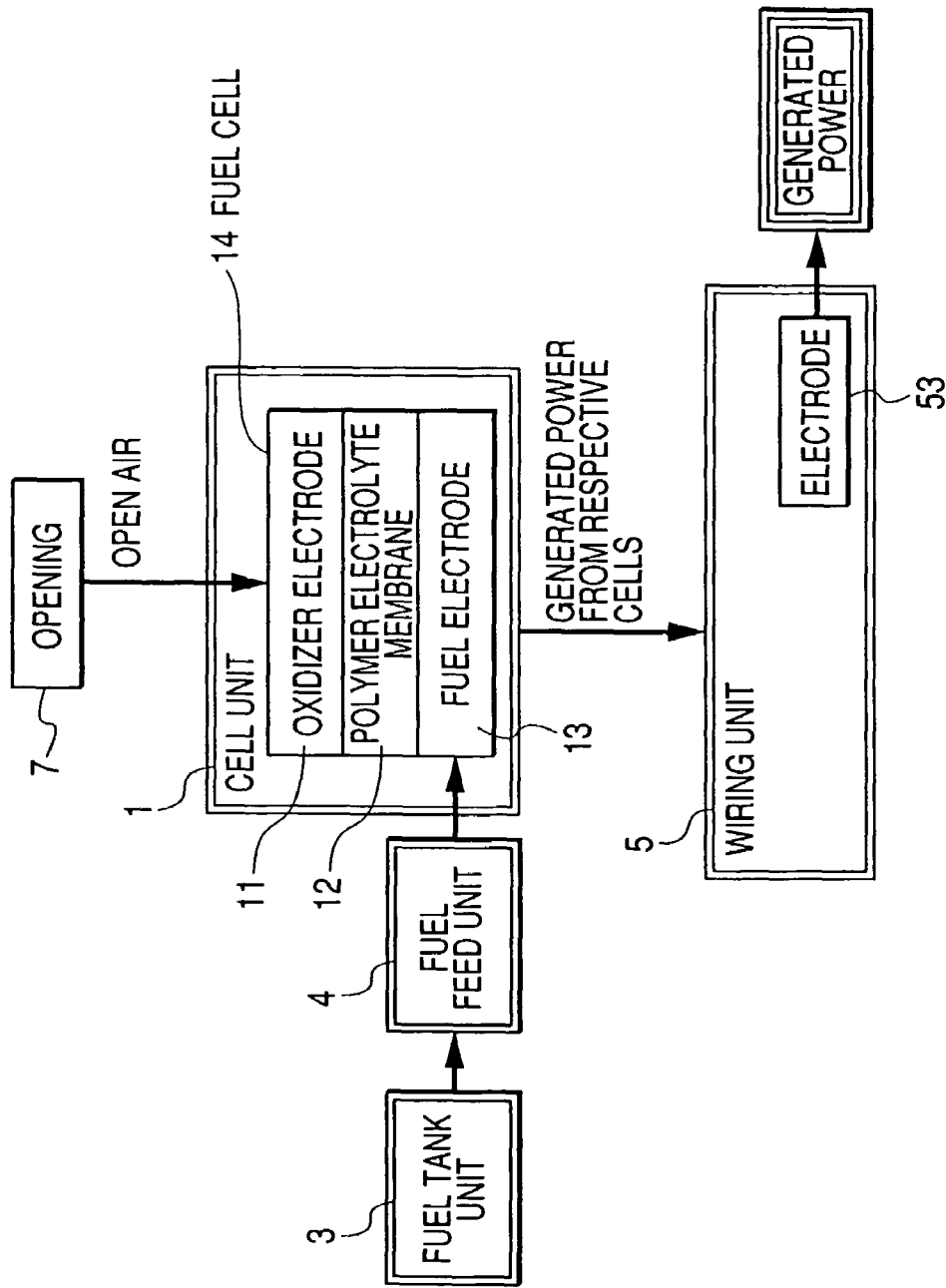
FIG. 5 is a schematic diagram showing a system of the fuel cell system of the first invention according to this application.

FIG. 1 is a perspective view showing an example of a fuel cell system of the present invention. FIG. 2A is a plan view of the fuel cell system in FIG. 1. FIG. 2B is a partial sectional plan view of the fuel cell system in FIG. 1. FIG. 3A is a front view of the fuel cell system in FIG. 1. FIG. 3B is a partial sectional plan view of the fuel cell system in FIG. 1. FIG. 4 is a left side view of the fuel cell system in FIG. 1. FIG. 5 is a schematic diagram showing a system of the fuel cell system of the present invention. In addition, FIGS. 2A and 3A show the inside of the fuel cell system as if it is seen from the outside of a transparent housing 2.

The external dimensions of the fuel cell system of the present invention shown in FIG. 1 are, for example, 30 mm in length (a)×50 mm in width (b)×10 mm height (c), and the fuel cell system has almost the same dimensions as those of a lithium ion battery usually used for a compact digital camera.

Figure 8:
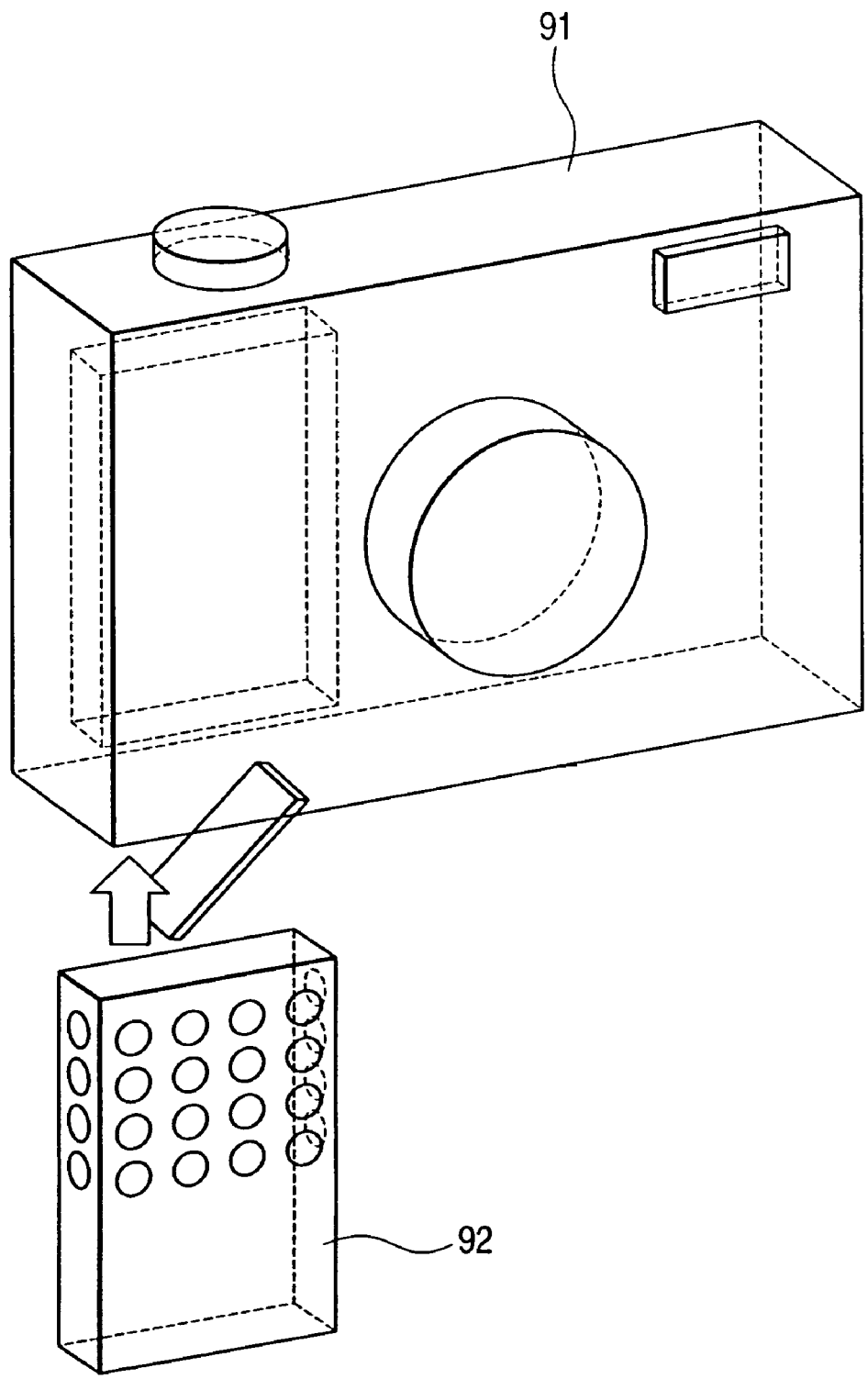
FIG. 8 is a schematic perspective view showing a digital camera where the fuel cell of the present invention is mounted.

FIG. 8 is a schematic perspective view showing a digital camera in which the fuel cell system of the present invention is mounted. As shown in FIG. 8, since a digital camera 91, which is one of the small electric devices of the present invention, is small and unified, a small fuel cell system 92 has a shape that is easily incorporated into the digital camera, which is a portable device. Moreover, a thin rectangular parallelepiped shape of a fuel cell system makes it easy to incorporate it into a small electric device in comparison with a thick rectangular parallelepiped shape or a cylindrical shape.

In order to miniaturize a fuel cell system and to achieve a large capacity and a high output, as the means, the present invention maximizes a fuel tank capacity for obtaining a sufficient battery capacity in the volume of a small housing, a fuel cell area for obtaining a sufficient output, and a number of air vents for efficiently supplying an oxidizer to the fuel cell. At the same time, the present invention optimizes the positional relationship among the fuel tank unit, the fuel feed unit and the cell unit inside the housing.

In FIG. 1, the fuel cell system of the present invention is a portable fuel cell system mounted in and used for a small electric device, such as a digital camera, a digital video camera, a small projector, a small printer and a notebook sized personal computer. This fuel cell system includes a cell unit 1 comprising four fuel cells 14, a fuel tank unit 3 for storing a fuel to be supplied to the cell unit 1, a fuel feed unit 4 for supplying the fuel of the fuel tank unit 3 to the cell unit 1, openings 7 for supplying an oxidizer gas to the cell unit 1, and a wiring unit 5 for collecting and temporarily storing the power generated by the cell unit 1, and supplying to the outside the power that is always stabilized, in a thin housing 2 having a substantially rectangular parallelepiped shape, wherein the above-mentioned fuel tank unit 3, fuel feed unit 4, and cell unit 1 are located in this order in one direction between two opposite short side faces 83a and 83b of the housing 2.

The fuel cell system of the present invention has openings 7, which are air vents for taking in the open air and provided in a top face 82, a bottom face 81, and long side faces 84a and 84b of the housing 2, so as to take in oxygen used for a reaction as an oxidizer gas from the open air. In addition, the openings 7 are also used to release the generated water as steam and to release the heat generated by a reaction to the outside. Moreover, the wiring unit 5 is provided in one short side face 83b of the housing 2, and electrodes 53 for taking out electricity are provided in the wiring unit 5.

On the other hand, the inside of the housing 2 is constituted by a cell unit 1 each including one or more fuel cells 14 comprising a fuel electrode 13, a polymer electrolyte membrane 12, an oxidizer electrode 11 and a catalyst (see FIG. 5), the fuel tank unit 3 for storing a fuel, the fuel feed unit 4 for decompressing the fuel from the fuel tank and leading it to a reactive electrode of each cell, and the wiring unit 5 for collecting the power generated by each fuel cell 14.

FIG. 5 is a schematic diagram showing a system of the fuel cell system of the present invention shown in FIG. 1. In this diagram, the fuel contained in the fuel tank unit 3 is supplied to the fuel electrode 13 of the fuel cell 14 of the cell unit 1 through the fuel feed unit 4 from the fuel tank unit 3. Air is used as an oxidizer gas and open air is supplied to the oxidizer electrode 11 of the fuel cell 14 through the openings 7, which are air vents. The cell unit 1 is constituted by one or more fuel cells 14, and the fuel cell 14 comprises the fuel electrode 13, the polymer electrolyte membrane 12, the oxidizer electrode 11 and a catalyst. The power generated in each fuel cell 14 by the supply of the fuel from the fuel tank unit 3 and the oxidizer gas from the open air is temporarily stored in the wiring unit 5, and the always stabilized generated power is supplied to the outside via the electrodes 53.

Figure 6A:
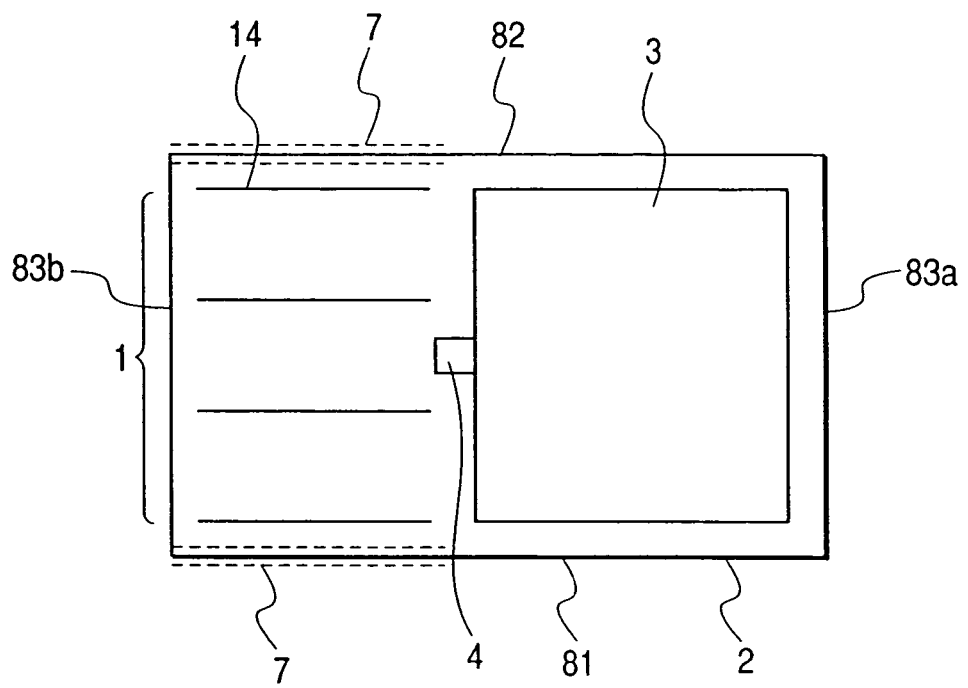
FIG. 6A is a schematic diagram showing the relationship of the arrangement among a cell unit, a fuel tank unit and an opening in the fuel cell system of the first aspect according to present invention.
Figure 6B:
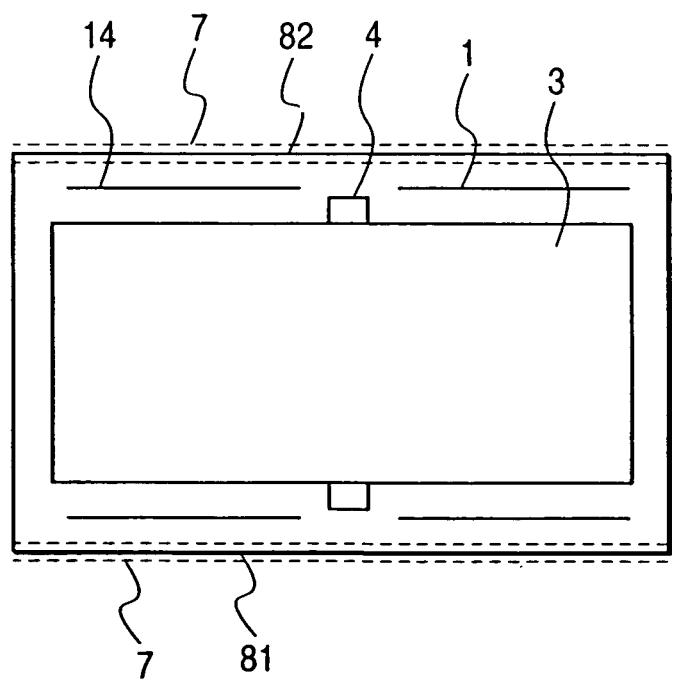
FIG. 6B is a schematic diagram showing the relationship of arrangement among a cell unit, a fuel tank unit and an opening in the fuel cell system of the first aspect according to the present invention.

FIGS. 6A and 6B are schematic diagrams showing the arrangement relationship among the cell unit, the fuel tank unit and the openings in the fuel cell system of the present invention.

FIG. 6A shows the same arrangement as in FIG. 1. The cell unit 1, the fuel feed unit 4 and the fuel tank unit 3 are located in series between the short side faces 83a and 83b of the housing 2 in one direction, and the fuel tank unit 3 is in the side face of the fuel cell 14. Moreover, the top face 82 and bottom face 81 of the housing 2, each having the openings 7, are located opposite to the faces of the fuel cell.

FIG. 6B is constituted by locating the openings 7 in the faces where the surface areas of the housing 2 of the fuel cell system are at a maximum, locating the fuel cells 14 of the cell unit 1 to face the face having the openings 7, and locating the fuel tank unit 3 inside the cell unit 1. In the order of the cell unit 1, the fuel feed unit 4, the fuel tank unit 3, the fuel feed unit 4, and the cell unit 1 are located between the top face 82 and bottom face 81 of the housing 2.

In FIG. 6B, although the fuel cells 14 are located at both sides of the fuel tank unit 3 (top face side and bottom face side of the housing), it is also sufficient that the fuel cells 14 are only on the top face side of the housing 2, or are only on the bottom face side of the housing 2.

When a fuel cell system is thin, the system in FIG. 6A is effective so as to accommodate a large fuel tank capacity. On the other hand, more efficiently, in order to take in an oxidizer from openings and to supply it to an oxidizer electrode, the system in FIG. 6B is effective.

The fuel cell of the present invention has an electromotive force of 0.8 V and current density of 300 mA/cm$^2$, and the dimensions of a unit cell are 1.2 cm×2 cm. The output of the entire battery is 4.6 W at 6.4 V and 720 mA when eight sheets of these fuel cells are connected in series.

Hereafter, each part of the fuel cell system of the present invention will be explained in detail.

Figure 7:
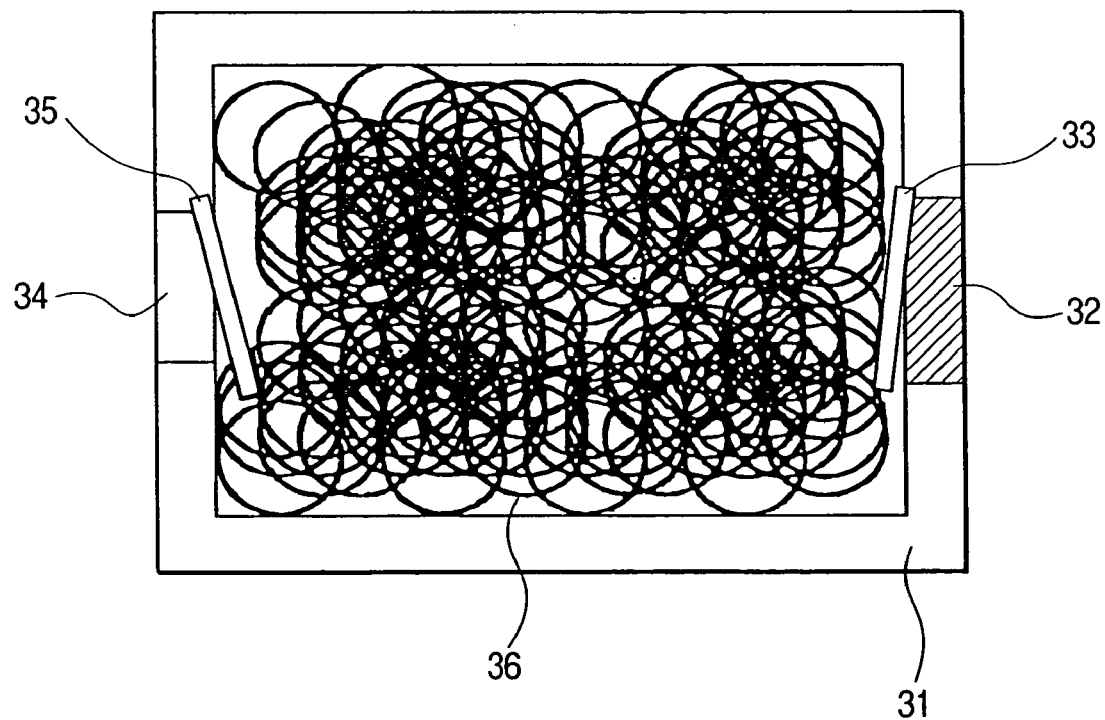
FIG. 7 is a schematic diagram showing the outline of a fuel tank.

First, the fuel tank unit 3 will be explained. FIG. 7 is a schematic diagram showing the outline of the fuel tank. The fuel cell system of the present invention uses hydrogen as fuel. The inside of a fuel tank 31 is filled with a carbon-based material 36 capable of occluding the hydrogen, such as a carbon nanotube, a graphite nanofiber or a carbon nanohorn. These carbon-based materials 36 can occlude about 10% by weight of hydrogen at the pressure of 4 MPa. Since the internal pressure of the fuel tank after hydrogen occlusion reaches about 4 MPa, it is desirable to construct the fuel tank 31 from a high strength material, such as stainless steel, a magnesium alloy, or titanium. For example, when a safety factor is 5 in the case of a fuel tank of about 30 mm square, and the thickness of a material is required to be about 2 mm or more in the case of stainless steel or about 1 mm or more in the case of titanium. Taking into consideration the volume of the fuel cell and fuel flow paths, it is preferable that the outer dimensions of the fuel tank be 2.5 cm×3 cm×1 cm. It is assumed that titanium is used for an outer wall and the tank has a thickness of 1 mm. At this time, the weight of the fuel tank is about 10 g, and the volume of the fuel tank is 5.2 cm$^3$. This fuel tank is about one third the weight and 1.5 times the volume of a fuel tank with a stainless steel outer wall. The energy stored in the fuel tank is about 7.0 W-hr, which is about 2.5 times the conventional lithium ion battery.

In addition, it is also possible to produce a fuel cell system integrally with a mobile device. Moreover, it is also possible to replace only a fuel tank at the time fuel is replaced by producing a fuel tank that is detachable from a cell unit. It is also possible for a user to replace the entire fuel cell system, while repacking the fuel involves removing only the fuel tank. It is also possible to replace only the cell portion other than a fuel tank to account for the exhaustion of a catalyst, etc., or the degradation of a polymer electrolyte membrane.

A fuel release hole 34 is provided in the fuel tank 31, and when the fuel tank is detachable from a fuel cell system, hydrogen is supplied to the cell unit 1 from the fuel release hole 34 by attaching the fuel tank to the fuel cell system. In that case, a release valve 35 is attached to the fuel release hole 34 in order not to leak fuel to the outside when the fuel tank is removed. The valve opens only when the fuel tank 31 is mounted in the fuel cell system. It is also possible that a fuel inlet 32 serves as the fuel release hole 34 in one opening.

Next, the fuel feed unit 4 will be explained. Hydrogen used for the fuel is led from the fuel tank to the fuel electrode 13. On the other hand, the open air containing oxygen is led to the oxidizer electrode 11 through the openings 7. In fuel cell system systems used for conventional automobiles, in order to efficiently supply oxygen to a cell, a fan was required to be provided between the openings and cell. However, in the small fuel cell system of the present invention, it is possible to efficiently perform the ventilation by making the oxidizer electrode 11 of the cell sufficiently close (1 cm or less) and parallel to the openings 7 and also providing an opening in the direction vertical to the cell, where a face of the oxidizer electrode does not face the fuel cell system housing.

A housing having a substantially rectangular parallelepiped shape, which is small and thin, is used as the housing 2, which may partially have a transformation, a convexity, or a concavity in a rectangular parallelepiped. Moreover, a thin housing with the height (c) of 2 to 100 mm is preferable. In addition, a housing having the length (a) of 5 to 200 mm and the ratio of the length (a):width (b)=1:1 to 1:20 is preferable.

Hereafter, a second aspect of the present invention will be explained in detail in the following embodiment.

Second Embodiment

A fuel cell system of this embodiment according to the second aspect of the present invention is formed by stacking at least one of each of the two types of fuel cell(s) A and fuel cell(s) B, in turn, wherein each fuel cell has a fuel electrode on one face and an oxidizer electrode on another face. The cells are stacked in turn so that the fuel electrode of the cell A and the fuel electrode of the cell B face each other, and the oxidizer electrode of the cell A and the oxidizer electrode of the cell B face each other. A common fuel flow path is provided between the fuel electrodes of the above-mentioned fuel cells A and B that face each other, and a common oxidizer flow path is provided between the oxidizer electrodes that face each other.

As mentioned above, since a fuel cell also serves as a separator of a conventional battery by being located at both sides of a fuel flow path, a stacked fuel cell system of the present invention does not require a separator. Accordingly, since it is possible to enlarge the depth of a fuel flow path, for example, to make twice that of the conventional fuel flow path, it is possible to supply fuel to the cells very efficiently.

Moreover, when a flow path with the same depth as a conventional fuel cell system is used, it is possible to decrease the number of fuel flow paths and oxidizer flow paths to decrease the volume of a cell unit to about one half of the conventional fuel cell system, since there is no conventional battery separator in the fuel cell system of the present invention and a fuel flow path between the fuel electrodes, which face each other, and an oxidizer flow path between the oxidizer electrodes, which face each other, of the above-mentioned fuel cells A and B become common.

Furthermore, in the present invention, in order to prevent the leak of the fuel caused by the differential pressure between an oxidizer in the oxidizer electrode side and the fuel in a fuel electrode side, it is preferable to use a supporting member for the oxidizer flow path. Since a separator is not used for the fuel cell system of the present invention, unlike in a conventional stacking method, it is necessary to collect independently the electricity generated in each fuel cell. In the present invention, the electricity drawn from each electrode of fuel cells is collected in the wiring unit provided on the outside of the cell unit. When using this system, it is possible to the wiring lines from fuel spills, which was a problem of a three-dimensional wiring system.

Example 2

The present invention will be specifically explained with an example below on the basis of drawings.

Figure 9A:
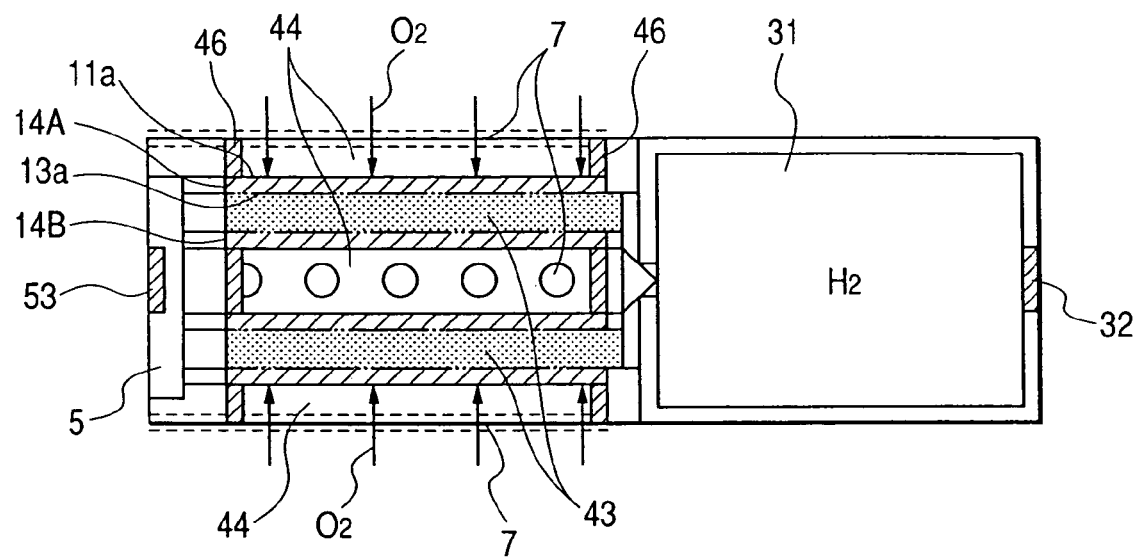
FIG. 9A is a front view of a fuel cell system of a second aspect of the present invention.
Figure 9B:
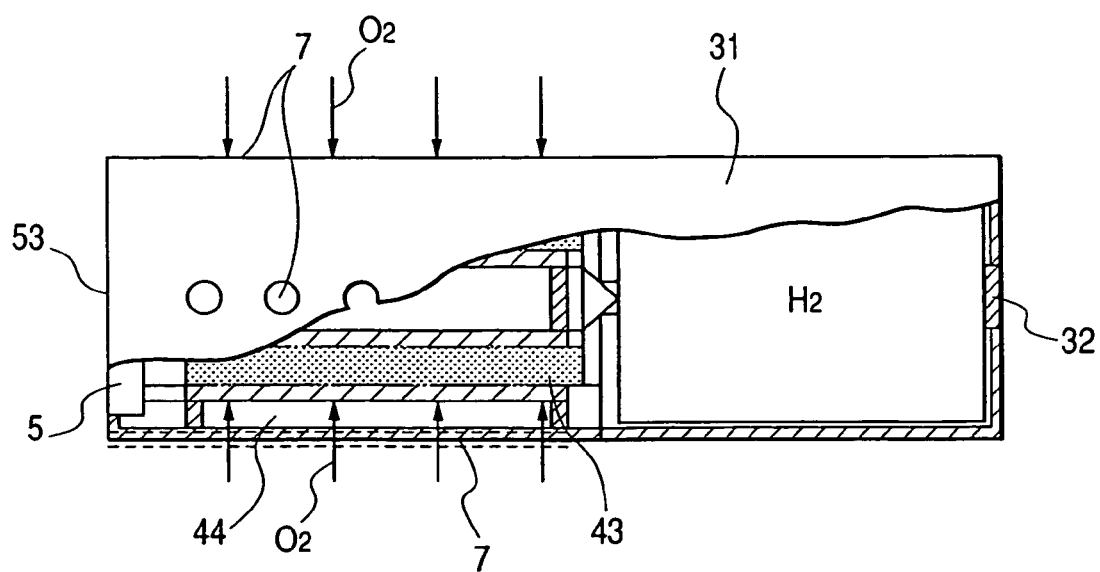
FIG. 9B is a partial sectional front view of the fuel cell system of the second aspect.
Figure 10:
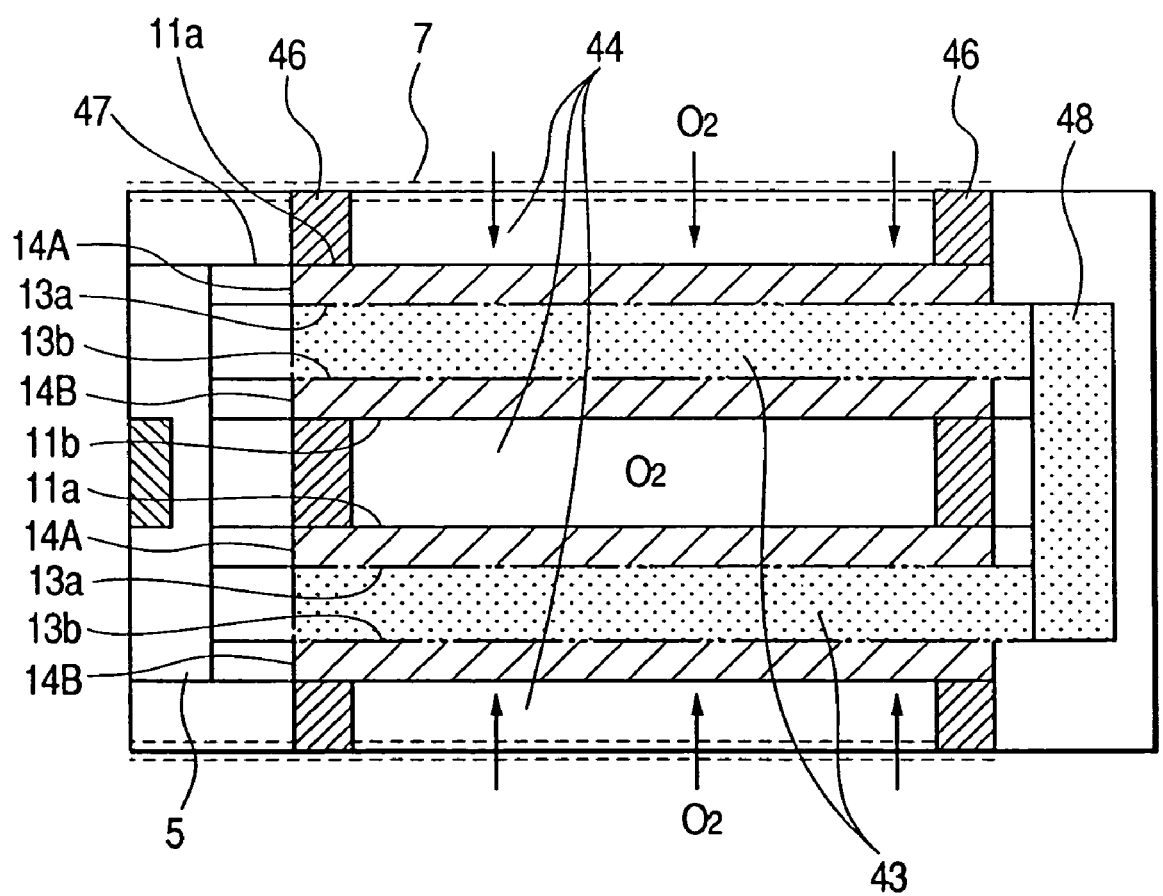
FIG. 10 is an explanatory diagram showing the structure of a cell unit of the second aspect of the present invention.
Figure 11:
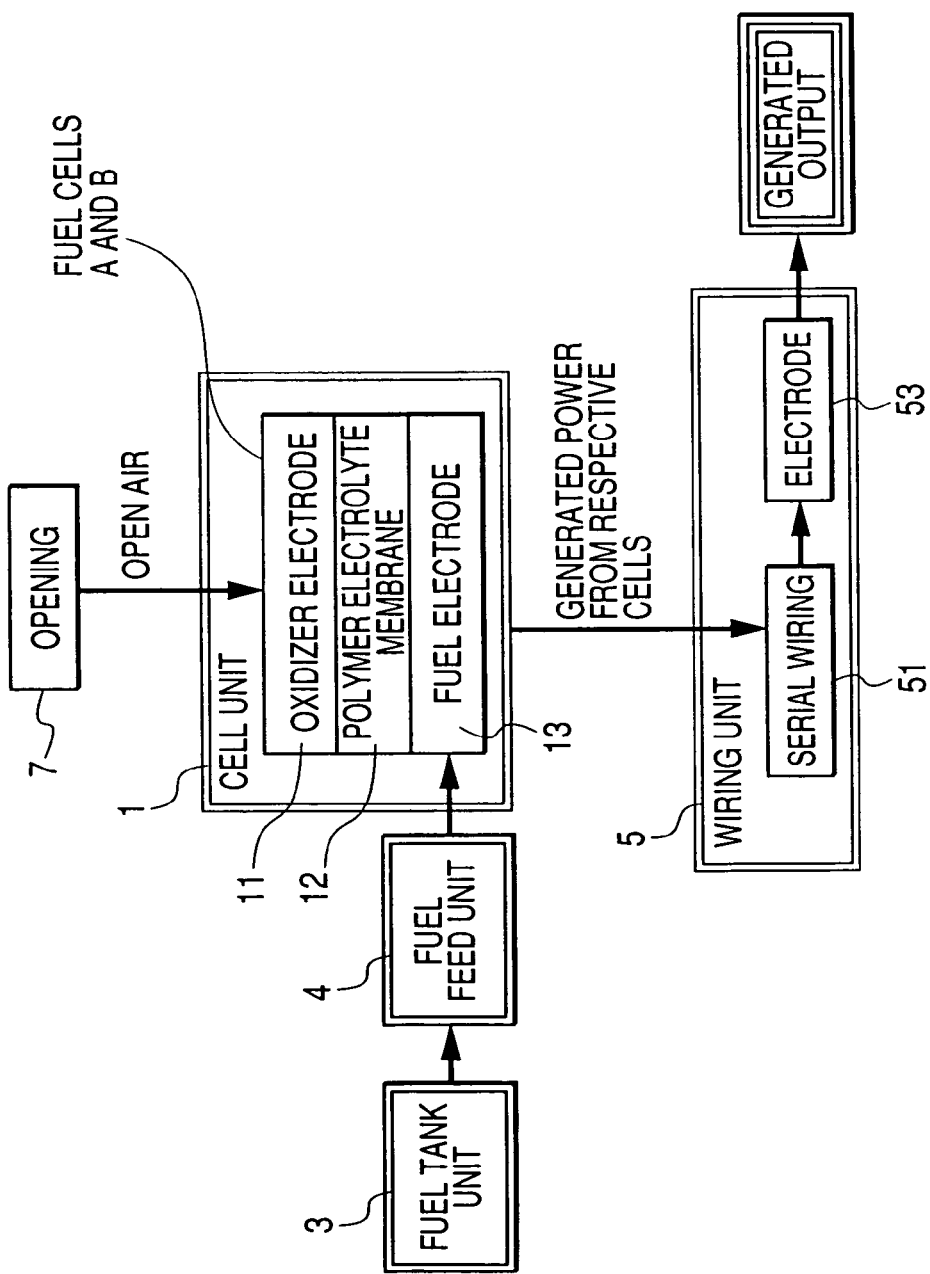
FIG. 11 is a schematic diagram showing a system of the fuel cell system of the second aspect of the present invention.
Figure 12:
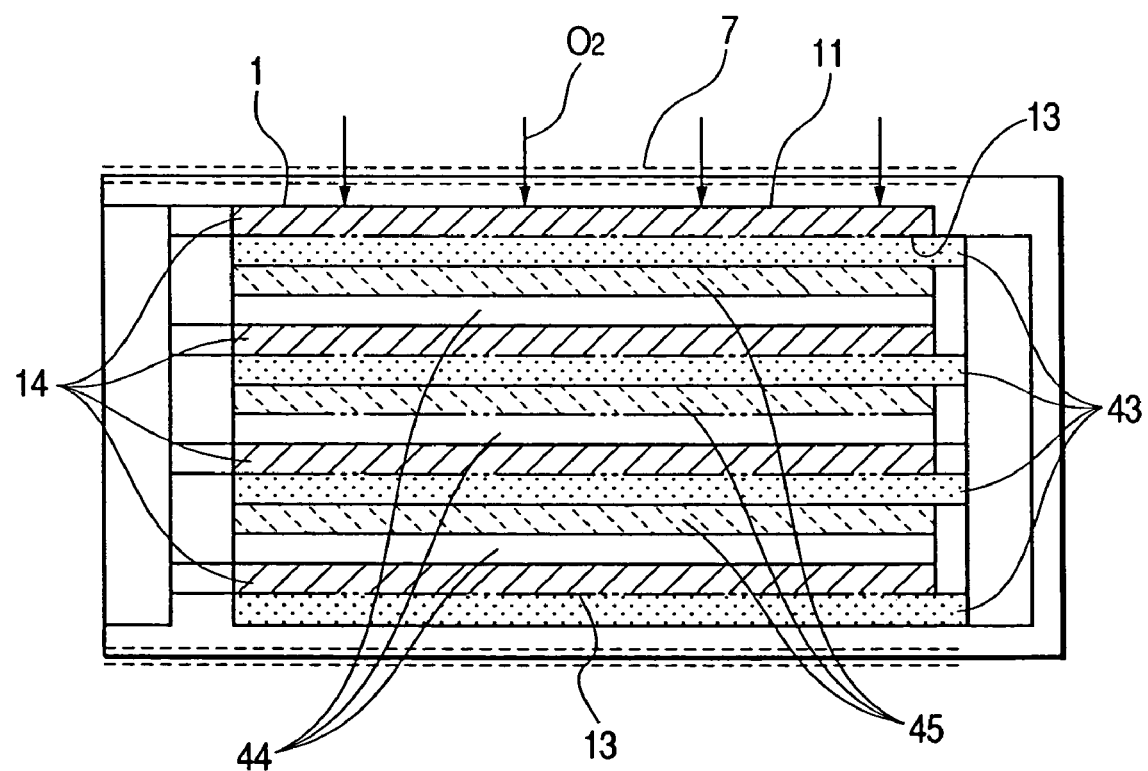
FIG. 12 is a schematic sectional diagram showing a general fuel cell system.

FIG. 1 is a perspective view showing an example of a fuel cell system of the present invention. FIG. 2A is a plan view of the fuel cell system in FIG. 1. FIG. 2B is a partial sectional plan view of the fuel cell system in FIG. 1. FIG. 9A is a front view of the fuel cell system in FIG. 1. FIG. 9B is a partial sectional front view of the fuel cell system in FIG. 1. FIG. 4 is a left side view of the fuel cell system in FIG. 1. FIG. 10 is an explanatory diagram showing the structure of a cell unit of the fuel cell system according to the present invention. FIG. 11 is a schematic diagram showing a system of the fuel cell system of the present invention. FIGS. 2A and 9A show the inside of the housing as if seen from the outside of a transparent housing 2.

The external dimensions of the fuel cell system of the present invention shown in FIG. 1, for example, are 30 mm length (a)×50 mm width (b)×10 mm height (c), and are almost the same as the dimensions of a lithium ion battery typically used for a compact digital camera.

FIG. 8 is a schematic diagram showing a digital camera in which the fuel cell system of the present invention is mounted. As shown in FIG. 8, since a digital camera 91, which is one of the small electric device of the present invention, is small and unified, a small fuel cell system 92 has a shape that is easily incorporated into the digital camera, which is a portable device.

In order to compactly contain each fuel cell in a fuel cell system, and to broaden fuel flow paths and to supply a fuel to fuel electrodes efficiently, in the present invention, each fuel cell is stacked so that the fuel electrodes face each other and the oxidizer electrodes face each other, and a common fuel flow path is provided between the fuel electrodes of the fuel cells that face each other and a common oxidizer flow path is provided between the oxidizer electrodes that face each other.

In FIG. 1, the fuel cell system of the present invention comprises a cell unit 1 comprising two fuel cells A and two fuel cells B, a fuel tank unit 3 for storing a fuel to be supplied to the cell unit 1, a fuel feed unit 4 for supplying the fuel of the fuel tank unit 3 to the cell unit 1, air vents 7 for supplying an oxidizer gas to the cell unit 1, and a wiring unit 5 for collecting and temporarily storing the power generated by the cell unit 1, and supplying to the outside the power that is always stabilized.

The fuel cell system of the present invention has the air vents 7 for taking in the open air in a top face 82, a bottom face 81, and long side faces 84a and 84b of the housing 2 so as to take in oxygen used for a reaction as an oxidizer gas from the open air. Moreover, the air vents 7 also perform the action of releasing generated water as steam and releasing the heat generated by a reaction to the outside. In addition, the wiring unit 5 is provided on one short side face 83b of the housing 2, and electrodes 53 for drawing off electricity are provided in the wiring unit 5.

On the other hand, the inside of the housing 2 is constituted by the cell unit 1 comprising one or more fuel cells A and B (14A, 14B) comprising a fuel electrode 13, a polymer electrolyte membrane 12, an oxidizer electrode 11 and a catalyst (see FIG. 11); a fuel tank unit 3 for storing a fuel; a fuel feed unit 4 for decompressing the fuel from the fuel tank and leading it to a reactive electrode of each cell; and a wiring unit 5 for collecting the power generated by respective fuel cells 14A and 14B.

Next, the fuel cell system of the present invention will be explained with reference to FIGS. 9A, 9B and 10.

In FIGS. 9A, 9B and 10, the fuel cell system of the present invention is provided by stacking two types of fuel cells A (14A) and the fuel cells B (14B), in turn. The fuel cell A has a fuel electrode 13a on the lower face and the oxidizer electrode 11a on the upper face. The fuel cell B has the oxidizer electrode 11b on the lower face and the fuel electrode 13b on the upper face in reverse to the fuel cell A, so that the fuel electrode 13a of the fuel cell A and the fuel electrode 13b of the fuel cell B face each other. The oxidizer electrode 11a of the fuel cell A and the oxidizer electrode 11b of the fuel cell B face each other, wherein a fuel flow path 43 common between the fuel electrode 13a and fuel electrode 13b of the above-mentioned fuel cells A and B, which face each other, is provided, and an oxidizer flow path 44 common between the oxidizer electrode 11a and oxidizer electrode 11b, which face each other, is provided.

The above-mentioned fuel cell A and fuel cell B may have the same structure. The fuel cells are stacked in turn and provided so that the fuel electrodes face each other and the oxidizer electrodes face each other by reversing one kind of the fuel cells. That is, when reversing the fuel cell A, the fuel electrode and oxidizer electrode of the fuel cell A become the fuel electrode and oxidizer electrode of the fuel cell B.

In the fuel cell system of the above-described present invention, since the fuel cell also serves the functions of a separator in a conventional fuel cell system by providing the fuel cells on both of the upper and lower sides of the fuel flow path 43 when generating electricity in a plurality of fuel cells, a separator is unnecessary.

Moreover, it is possible to decrease the number of fuel flow paths and oxidizer flow paths to decrease the volume of a cell unit to about one half those of a conventional fuel cell system since the fuel flow path 43 between the fuel electrodes, which face each other, and the oxidizer flow path 44 between the oxidizer electrodes, which face each other, of the fuel cells A and B are shared. In addition, when the shared fuel flow path 43 is used, it is possible to enlarge the depth of the fuel flow path 43 to make it two times the fuel flow path of a conventional fuel cell. Therefore, it is possible to supply fuel to the fuel electrode very efficiently. Furthermore, in this example, since it is possible to make the depth of the fuel flow path and central oxidizer flow path about 2 mm, it is possible to fully supply the fuel efficiently. Moreover, in the stack system of the present invention, when a flow path with the same depth as a conventional flow path is used, it is possible decrease the volume of a cell unit by one half.

In addition, as the fuel, gaseous fuel, such as hydrogen, and liquid fuel, such as a chemical hydride, methanol or dimethyl ether, is used. As an oxidizer, oxygen, air or the like is used.

Furthermore, in order to prevent the leaking of the fuel from the boundary between the polymer electrolyte membrane and the fuel flow path, which is caused by the difference in substance between the fuel contacting the above-mentioned fuel electrode and the oxidizer contacting to the oxidizer electrode, and the difference in pressure between the oxidizer on the oxidizer electrode side and the fuel in the fuel electrode side, supporting members 46 are provided at both sides of the oxidizer flow path 44. Since the supporting members suppress the transformation of the cells, it is possible to prevent the cells from breaking and leaking fuel. It is also possible to prevent the contact of the cells. Moreover, in order to ease the fuel flow and to uniformly support a polymer electrolyte membrane, it is possible to insert a porous structure in the supporting member. In addition, when forming a flow path in the porous structure, it is possible to supply the fuel even more efficiently. As the porous material, for example, porous carbon, porous silicon, etc., are preferable.

FIG. 11 is a schematic diagram showing the fuel cell system of the present invention shown in FIG. 1. In this diagram, the fuel contained in the fuel tank unit 3 is supplied to the fuel electrodes 13 of the fuel cells A and B of the cell unit 1 through the fuel feed unit 4 from the fuel tank unit 3. Air is used as the oxidizer gas and the open air is supplied to the oxidizer electrodes 11 of the fuel cells A and B through the air vents 7. The cell unit 1 is constituted by one or more fuel cells A and B, and the fuel cells each comprise the fuel electrode 13, a polymer electrolyte membrane 12, the oxidizer electrode 11 and a catalyst. The structure is such that the power generated in each fuel cell by the supply of the fuel from the fuel tank unit 3 and the oxidizer gas from the open air is temporarily stored in the wiring unit 5 after flowing through a serial wiring 51, and the always stabilized generated power is supplied to the outside from an electrode 53.

Next, the wiring unit 5 will be explained. Since an electromotive force of a single cell of a fuel cell system is about 1 V at the maximum, it is necessary to obtain a predetermined voltage by connecting a plurality of cells in series so as to drive a mobile device, such as a digital camera. The fuel cell system of the present invention draws off electric power without deteriorating the fuel-sealing performance by collecting the electricity drawn off from each electrode with serial wiring 51 of the wiring unit 5 on the opposite side of the fuel chamber. In particular, by locating the wiring unit 5 in a vertical position with respect to a fuel cell, it is possible to shorten the wiring distance and to simplify the wiring. Moreover, it is possible to further simplify the wiring by locating electrodes for supplying an electric power to a small electric device from a fuel cell system adjacent to the wiring unit.

In addition, when a carbon-based material, such as a graphite nanofiber, is used for the fuel tank, which uses hydrogen as the fuel, the energy stored in the fuel tank is about 7.0 W·hr, which is about 2.5 times that of the conventional lithium ion battery. In each fuel cell of the present invention, an electromotive force is 0.8 V, current density is 300 mA/cm$^2$, and the dimensions of a unit cell are 1.2 cm×2 cm. The output of the entire battery is 4.6 W at 6.4 V and 720 mA with eight sheets of these fuel cells connected in series.

In the following embodiment, the drawing of the electric power from fuel cells, collection of this electric power, and maintenance of the stack strength of a plurality of fuel cells by a supporting member will be explained in detail.

Third Embodiment

A third embodiment of the present invention will be explained. The third embodiment is characterized by the structure for drawing electric power from each fuel cell and the structure for collecting this electric power in a stacking system of so-called homopolar opposed type fuel cells where fuel electrodes face each other and oxidizer electrodes of adjacent fuel cells face each other, respectively.

Figure 13A:
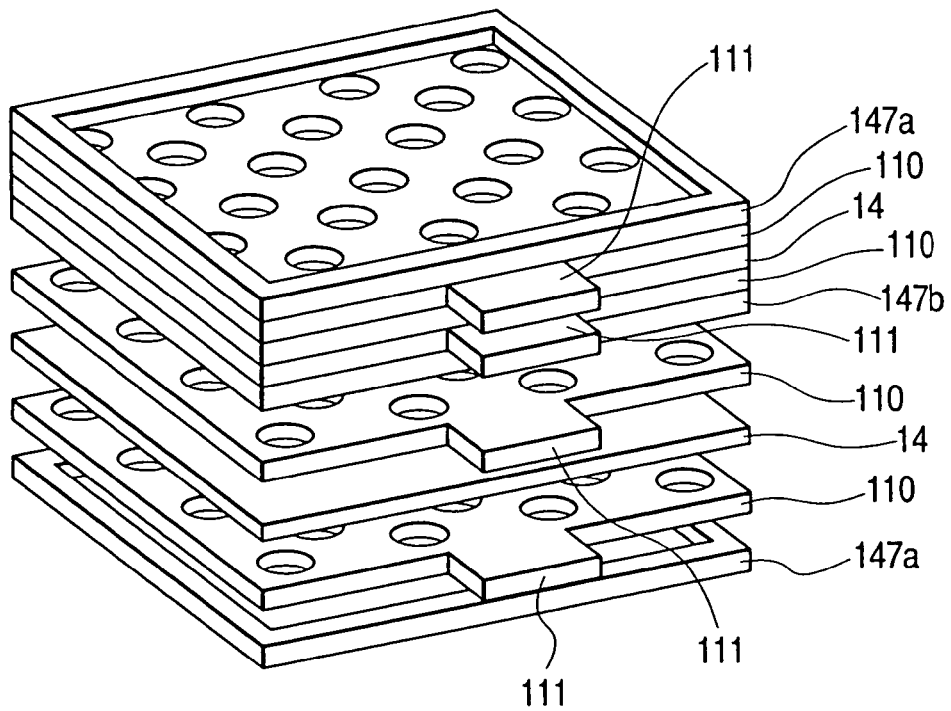
FIG. 13A is a perspective view for explaining a form of taking out power by collector members provided between the cells.
Figure 13B:
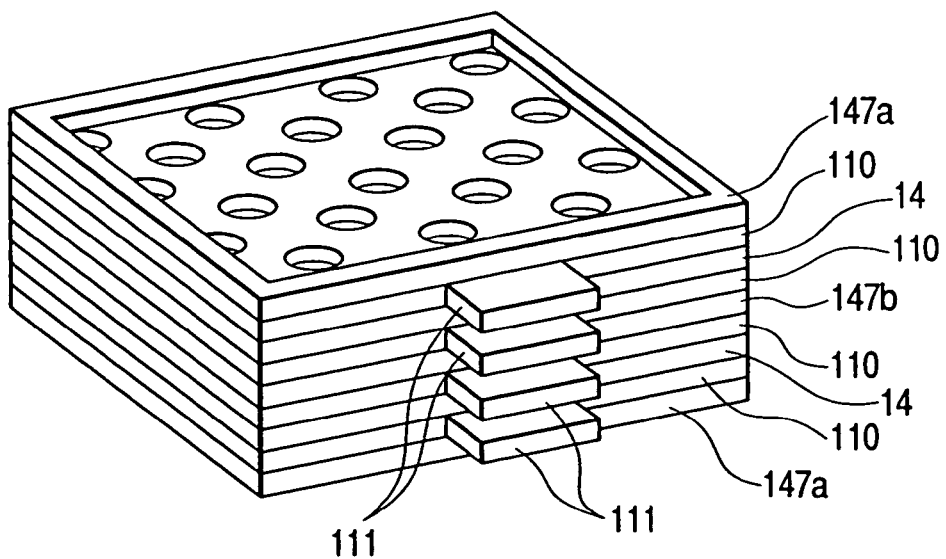
FIG. 13B is a perspective view of the state in which the cells and collector members are stacked.

FIG. 13A is a perspective view for explaining a form of drawing off electric power by collector members provided between fuel cells. FIG. 13B is a perspective view of the stacked fuel cells and collector members. Reference numeral 110 denotes a collector member, 111 denotes a power drawing off part (electric power output port) of the collector member 110, 112 denotes an air vent of the collector member 110, 147a and 147b denote insulating members, 147a denotes a supporting member of an oxidizer electrode chamber, and 147b denotes a fuel electrode chamber partition wall. The collector member 110 is provided in contact with the fuel cell 14. It collects the electric power generated in the fuel cells. The electric power of the fuel cells is drawn off from the electrode drawing off part 111 of the collecting electrode 110. The supporting member 147a of the oxidizer electrode chamber and the fuel electrode chamber partition wall 147b are provided between a fuel cell and another fuel cell (corresponding to the oxidizer electrode chamber and fuel electrode chamber, respectively) so as not to contact adjacent fuel cells mutually and contact adjacent collector member 110 mutually.

Figure 14A:
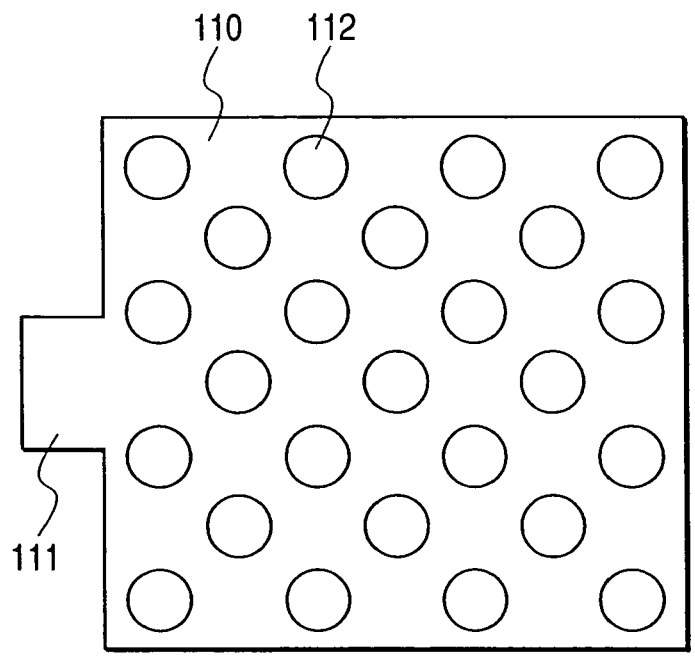
FIG. 14A is a plan view of the collector member.

FIG. 14A is a plan view of the collector member 110. The collector member 110 is made of an electroconductive material and is installed on each side of the oxidizer electrode and fuel electrode, which is not in contact with a polymer electrolyte membrane. A metal or a carbon material, such as graphite, can be used as the electroconductive material. Preferably, this material is not polluted with fuel nor does it pollute either a catalyst or an electrolyte membrane. As such a preferable material, for example, stainless steel or graphite can be used. The collector member is air permeable so as not to interfere with the supply of the fuel and the oxidizer. A porous member may be used or the air vent 112 may be provided for air permeability. The collector member has the power drawing off part 111, and the generated electricity can be collected by wiring from an electricity drawing off part. By wiring suitably, it is possible to connect a plurality of fuel cells in parallel or in series.

Fourth Embodiment

A fourth embodiment is an embodiment of forming a stack of a collector member, fuel cells, supporting members as oxidizer electrodes, and fuel electrode chamber partition walls by using the collector member having a power drawing off part shifted from the center.

Figure 14B:
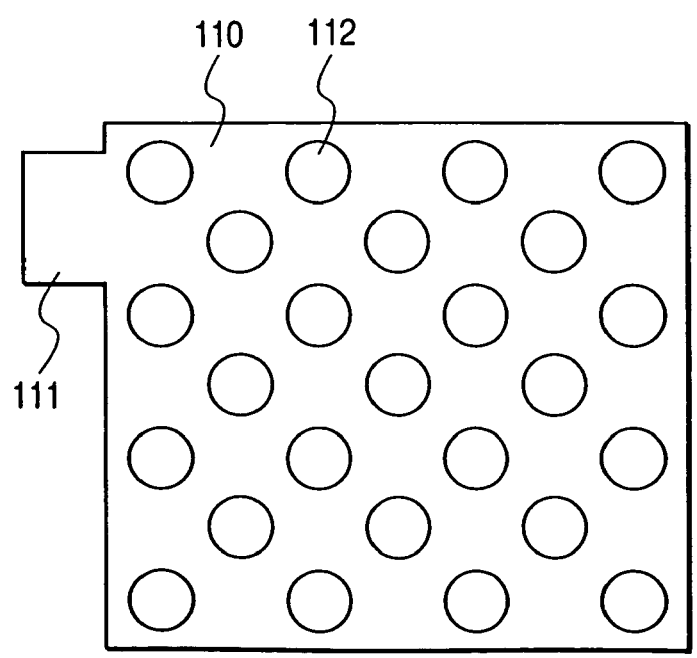
FIG. 14B is a plan view of a collector member where a power takeout part shifts from the center.

FIG. 14B is a plan view of the collector member having the power drawing off part shifted from the center. When this part is reversed and used, it is possible to shift the location at which the power is drawn off and to efficiently perform the wiring. When stacking collector members, fuel cells, supporting members, and partition walls by using the collector members each having a power drawing off part shifted from the center instead of the collecting electrodes having the electrode drawing off part 111 near the center as shown in FIG. 14A, the stack becomes the state as shown in FIG. 15.

Figure 15:
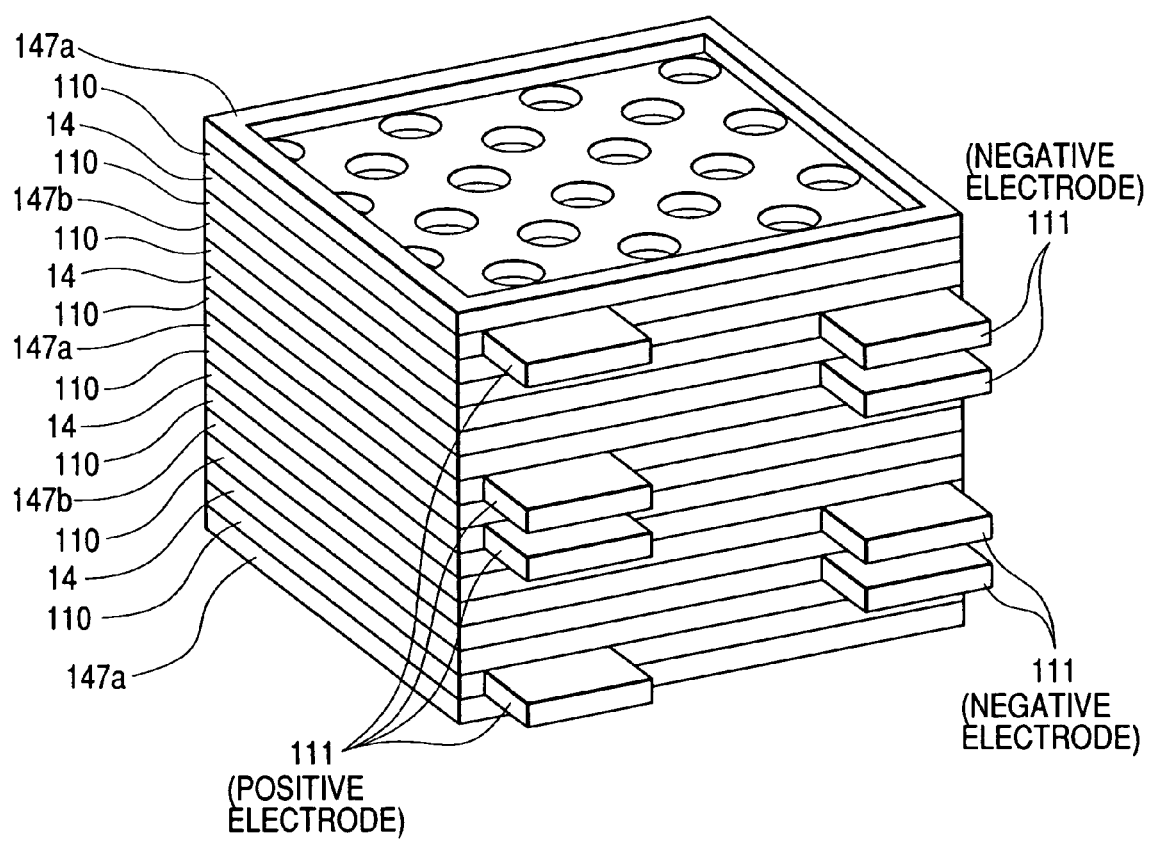
FIG. 15 is a perspective view of the stacked cells and collector members where a plurality of the cells are connected in parallel.

FIG. 15 is a perspective view of the state of stacking fuel cells and collector members in the case of a parallel connection of the plurality of fuel cells by using the collector members each having the power drawing off part shifted from the center shown in FIG. 14B. The collector members 110 with the same polarity are stacked so that the same electrode drawing off parts 111 are arranged on the same side. Negative electrodes are located on the right-hand side and positive electrodes are located on the left-hand side. Since electrodes with the same polarity are arranged on the same side, the polarity of the electrodes is easily distinguished.

Figure 16A:
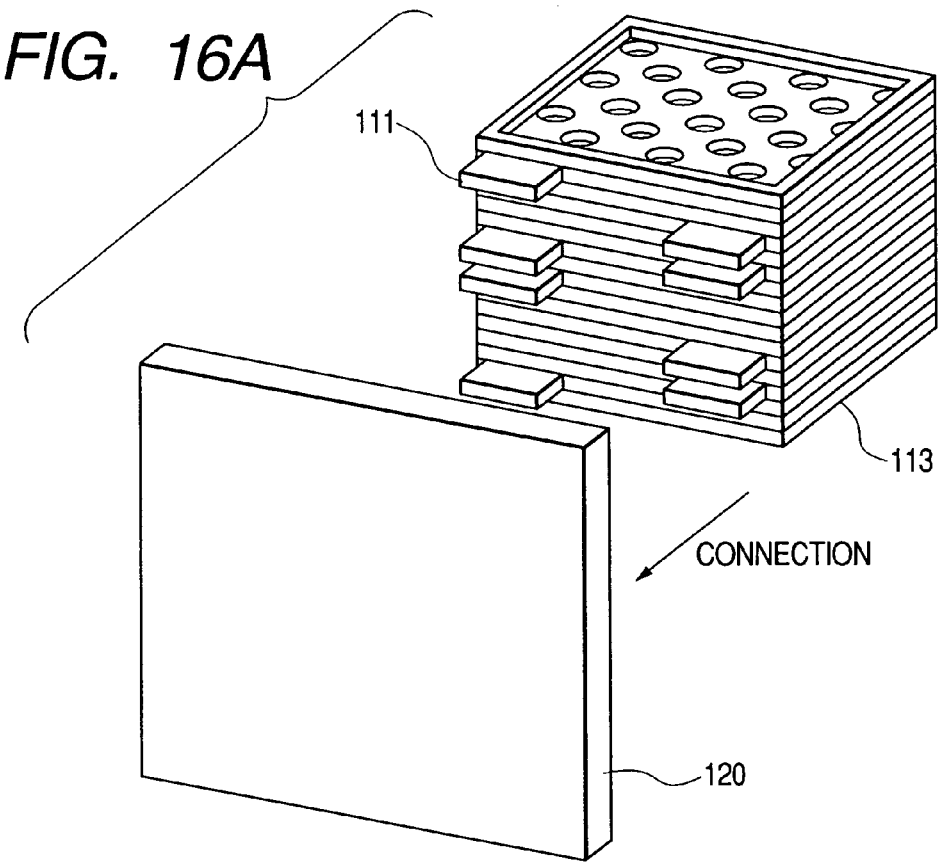
FIG. 16A is a diagram for explaining the state in which a stack of the cells and collector members is connected to a circuit board.

FIG. 16A is a diagram for explaining the structure in which a stack 113 of fuel cells and collector members, as shown in FIG. 15, is connected to a circuit board. A wiring member 120 is connected to the electrode drawing off parts 111 of the stack 113 so as to become vertical to the cells 14.

Figure 16B:
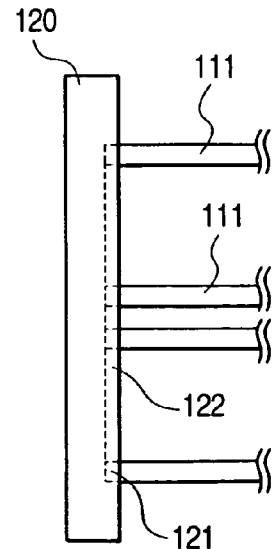
FIG. 16B is a diagram showing the connection structure of the collector members and circuit board.

FIG. 16B is a diagram showing the connection structure of the collector members and the circuit board. Reference numeral 122 denotes a wiring provided on the circuit board 120, and 121 denotes an entry of a collector member provided in the circuit board 120. The electrode drawing off parts 111 are inserted into the entries 121 of the circuit board 120, and a plurality of collector members are mutually connected electrically by the wiring 122.

Figure 16C:
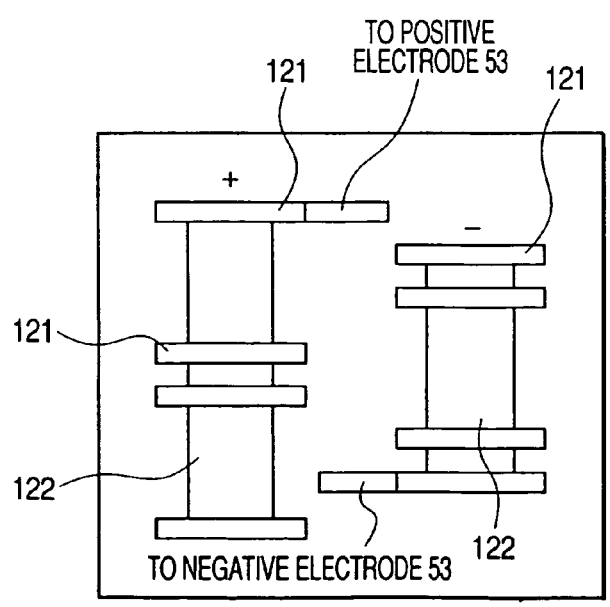
FIG. 16C is a front view showing the circuit board.

FIG. 16C is a front view showing the circuit board. It is possible to connect a plurality of fuel cells in parallel by electrically connecting the entries 121 as shown in the diagram. The collected electric power is led to the positive electrode 53 and negative electrode 53. Although an electromotive force of each fuel cell is small at about 0.8 V, it is possible to transform the voltage by using a DC-DC converter, etc., to supply electric power in the optimal voltage for an electric device.

Fifth Embodiment

A fifth embodiment is a form of connecting respective fuel cells in series.

Figure 17:
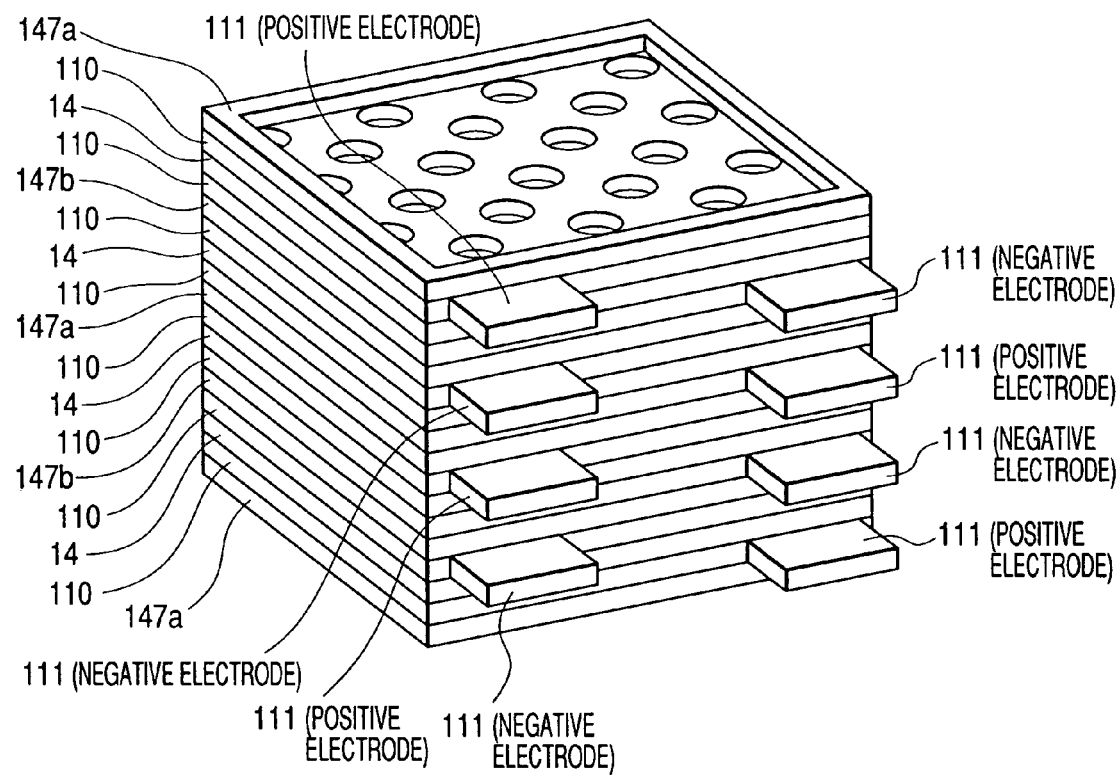
FIG. 17 is a perspective view of the stacked cells and collector members where a plurality of the cells are connected in series.
Figure 18B:
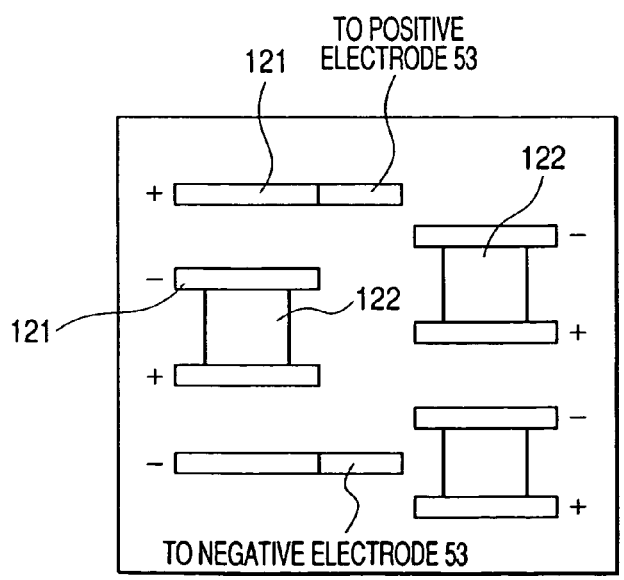
FIG. 18B is a front view showing the circuit board.
Figure 18A:
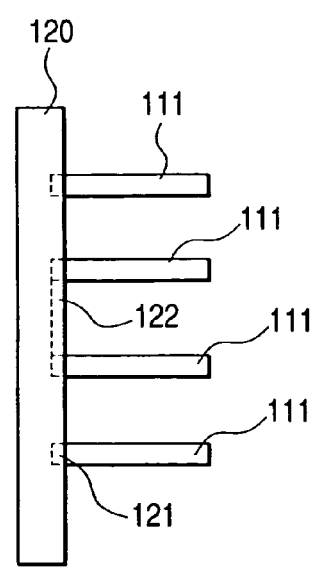
FIG. 18A is a diagram showing the connection structure of the collector members and circuit board.

FIG. 17 is a perspective view of stacked fuel cells and collector members when the plurality of fuel cells are connected in series. The collector members 110 are stacked so that their face and back may be changed by turning, as shown in FIG. 17. FIG. 18A is a diagram showing the connection structure of the collector members and the circuit board. FIG. 18B is a front view showing the circuit board. Respective fuel cells can be electrically connected in series by connecting the stack of the fuel cells and collector members to the circuit board 121 having a wiring pattern as shown in FIG. 18B.

In addition, when a collector member has a sufficient strength, it prevents a polymer electrolyte membrane from breaking or peeling from a joint, which is caused by the pressure change of a fuel tank, etc.

Sixth Embodiment

The sixth embodiment is for obtaining a stack of fuel cells, which is compact and very strong, without using a collector member.

Figure 19A:
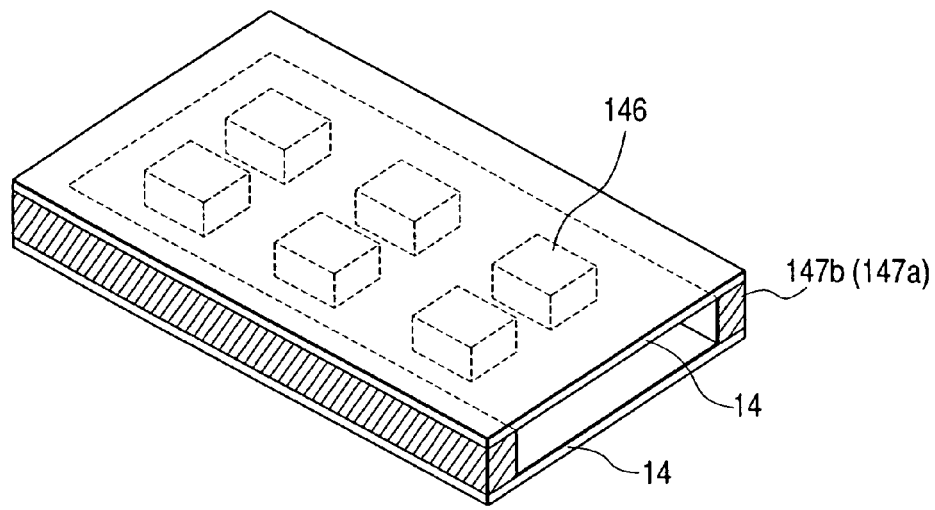
FIG. 19A is a perspective view of two cells and supporting members supporting them.
Figure 19B:
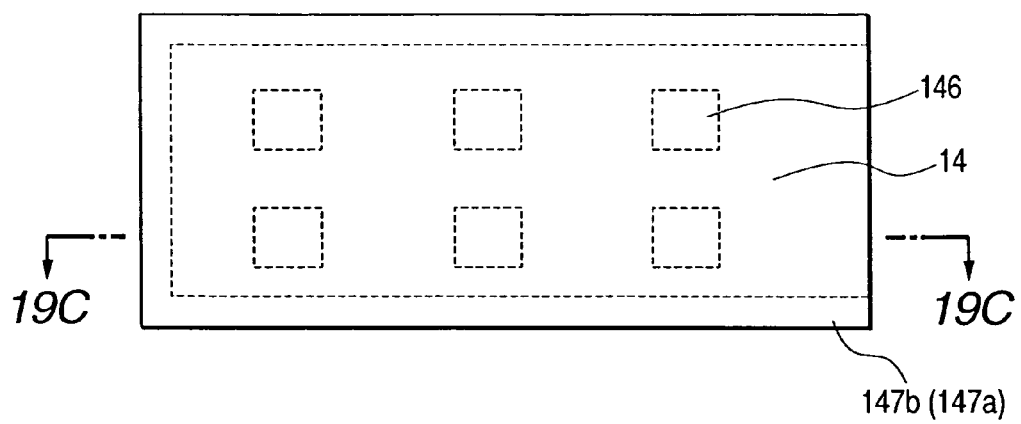
FIG. 19B is a plan view of FIG. 19A.
Figure 19C:
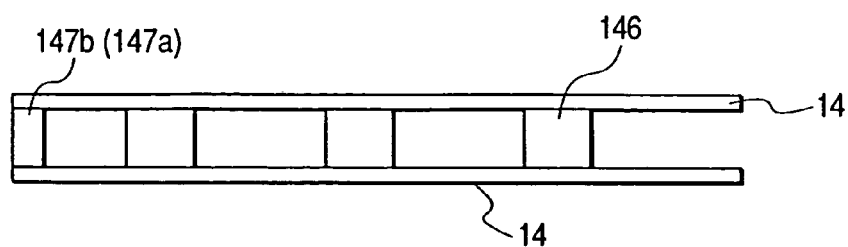
FIG. 19C is an end view along the 19C-19C line of FIG. 19B.

FIG. 19A is a perspective view of two fuel cells and their supporting members. FIG. 19B is a plan view of FIG. 19A. FIG. 19C is a sectional view along the 19C-19C line of FIG. 19B. Reference numeral 146 denotes a supporting member, 147a denotes a supporting member provided in the end of an oxidizer electrode chamber, and 147b denotes a fuel electrode chamber partition wall. As shown in FIG. 19A, the fuel electrode chamber partition wall 147b (or supporting member 147b) is sandwiched by two fuel cells 14, and other supporting members 146 are located near the center between two fuel cells 14 in a scattered manner to support the fuel cells 14.

For this reason, even if there is no collector member, the supporting members 146 can increase the strength of the stack of fuel cells. Since as shown in FIGS. 19A to 19C, a plurality of block-like supporting members 146 are located in a spattered manner, the flow of a fuel (or an oxidizer) between two fuel cells 14 is not disturbed.

Since the stack of fuel cells in the sixth embodiment does not have a collector member, this stack is correspondingly thin. Moreover, since the supporting members 146 are pressing the surfaces of the fuel cells 14, the breaking and peeling of a polymer electrolyte membrane caused by the pressure of the fuel, etc., is prevented.

Figure 25:
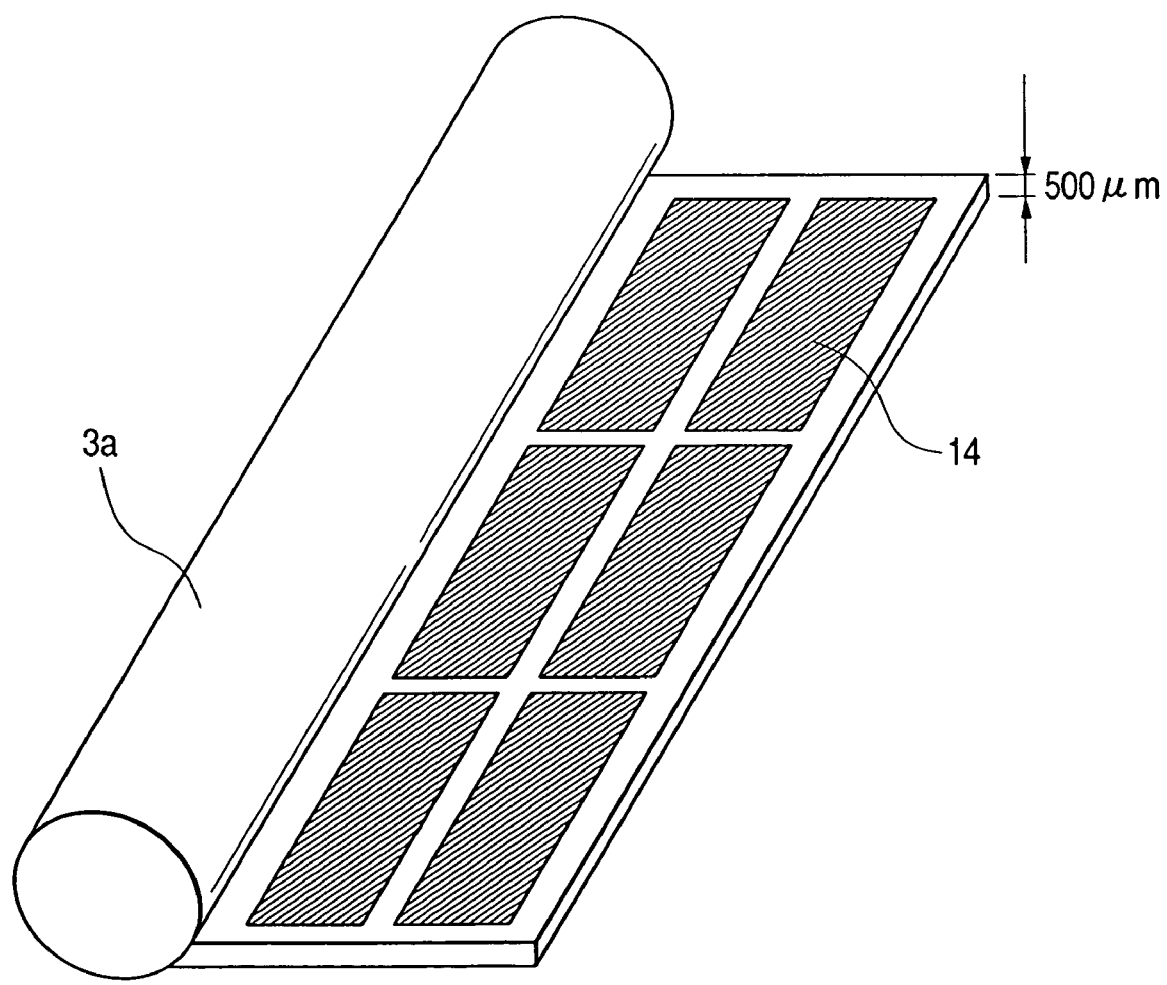
FIG. 25 is a perspective view showing a thin flexible fuel cell system.

Thus, since it is possible to sufficiently secure the strength of the stack of fuel cells by providing the supporting members 146 between the fuel cells without using a plate-like collector member, it is easy to produce a thin flexible fuel cell system as shown in FIG. 25.

In addition, the partition wall 147b in the fuel electrode chamber preferably preserves a hermetic state so that fuel would not leak to the outside. As the supporting member 146a located in the end of the oxidizer electrode chamber, it is preferable to have air permeability when open air as the oxidizer.

The modified examples of the stack of fuel cells of the sixth embodiment shown in FIGS. 19A to 19C are shown in FIGS. 20A to 24B.

Figure 20A:
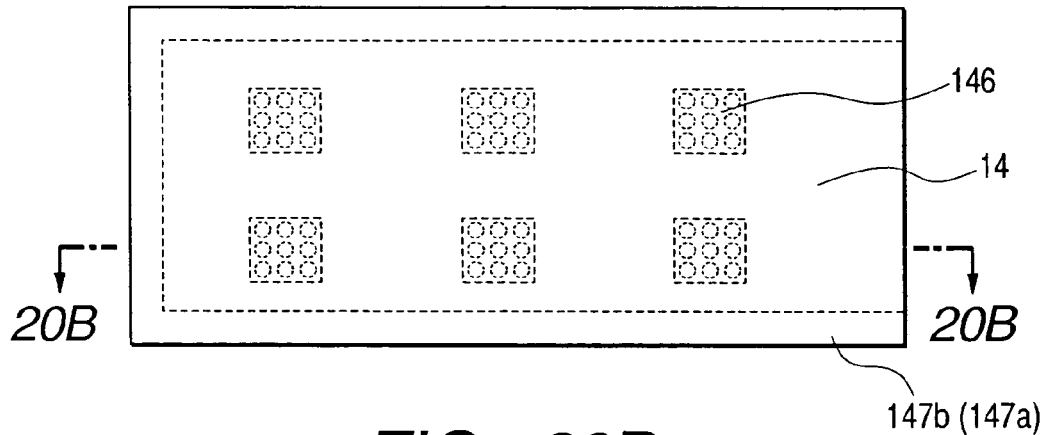
FIG. 20A is a pan view of two cells and porous supporting members supporting them.
Figure 20B:
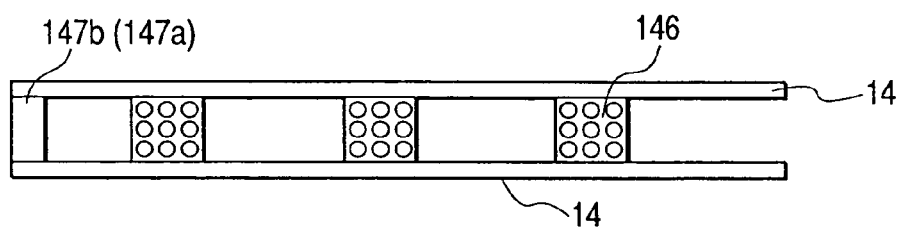
FIG. 20B is an end view along the 20B-20B line of FIG. 20A.

FIG. 20A is a plan view of two fuel cells and their porous supporting members. FIG. 20B is a sectional view along the 20B-20B line of FIG. 20A. A porous material is used as the supporting member 146. For this reason, the flow of the fuel (or the oxidizer) is not disturbed.

Figure 21A:
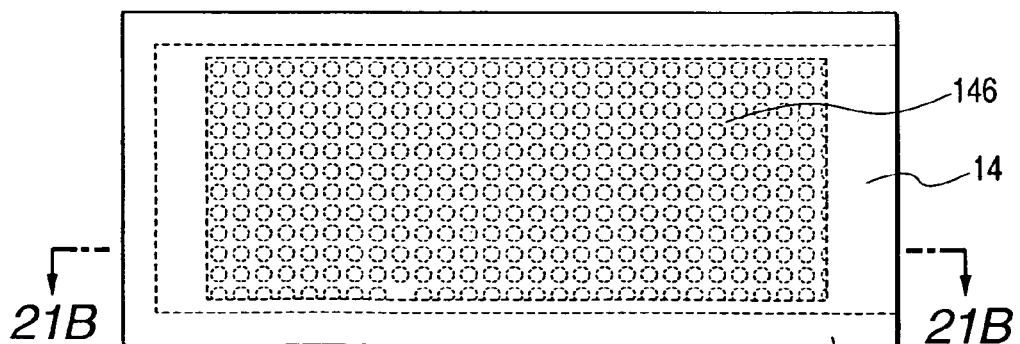
FIG. 21A is a plan view of two cells and porous supporting members supporting them.
Figure 21B:
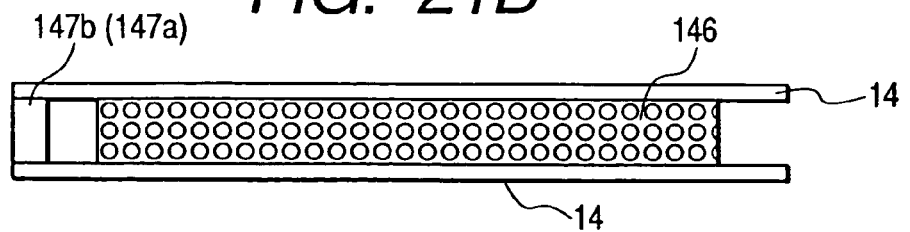
FIG. 21B is an end view along the 21B-21B line of FIG. 21A.

FIG. 21A is a plan view of two fuel cells and their porous supporting members. FIG. 21B is a sectional view along the 21B-21B line of FIG. 21A. Although the supporting member 146 is larger than the supporting member 146 shown in FIG. 19A, the flow of the fuel (or the oxidizer) is not disturbed since a porous material is used.

FIG. 22A is a plan view of two fuel cells and the supporting members that support them and have air vents. FIG. 22B is a sectional view along the 22B-22B line of FIG. 22A. The supporting member 146 has air vents 150. Since the fuel (or the oxidizer) can flow through the air vents 150, the flow of the fuel (or oxidizer) is not disturbed.

FIG. 23A is a plan view of two fuel cells and their supporting members with air vents. FIG. 23B is a sectional view along the 23B-23B line of FIG. 23A. Although the supporting member 146 is larger than the supporting member 146 shown in FIG. 19A, the flow of the fuel (or the oxidizer) is not disturbed due to the air vents 150.

Figure 24A:
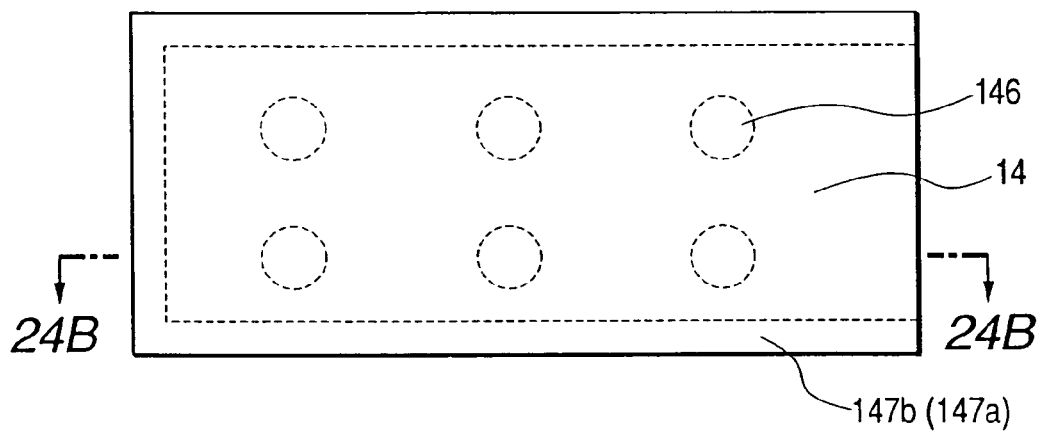
FIG. 24A is a plan view of two cells and spherical supporting members supporting them.
Figure 24B:
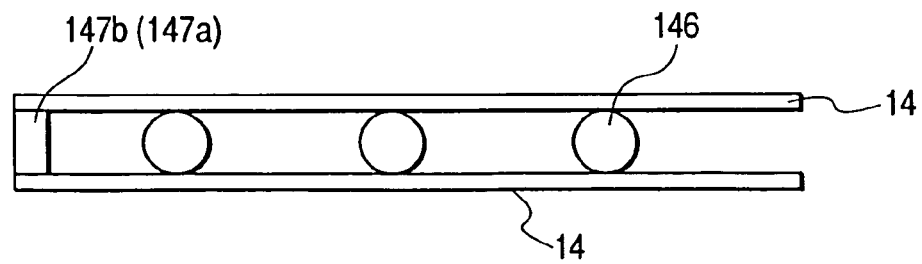
FIG. 24B is an end view along the 24B-24B line of FIG. 24A.

FIG. 24A is a plan view of two fuel cells and their spherical supporting members. FIG. 24B is a sectional view along the 24B-24B line of FIG. 24A. The shape of the supporting member 146 may be spherical.

Seventh Embodiment

In the seventh embodiment, the supporting members each located at the end of an oxidizer electrode chamber between fuel cells and a fuel electrode chamber partition wall play the role in collecting the electric power generated in the fuel cells instead of providing a member for collecting electricity like the collector member in the third embodiment.

Figure 26:
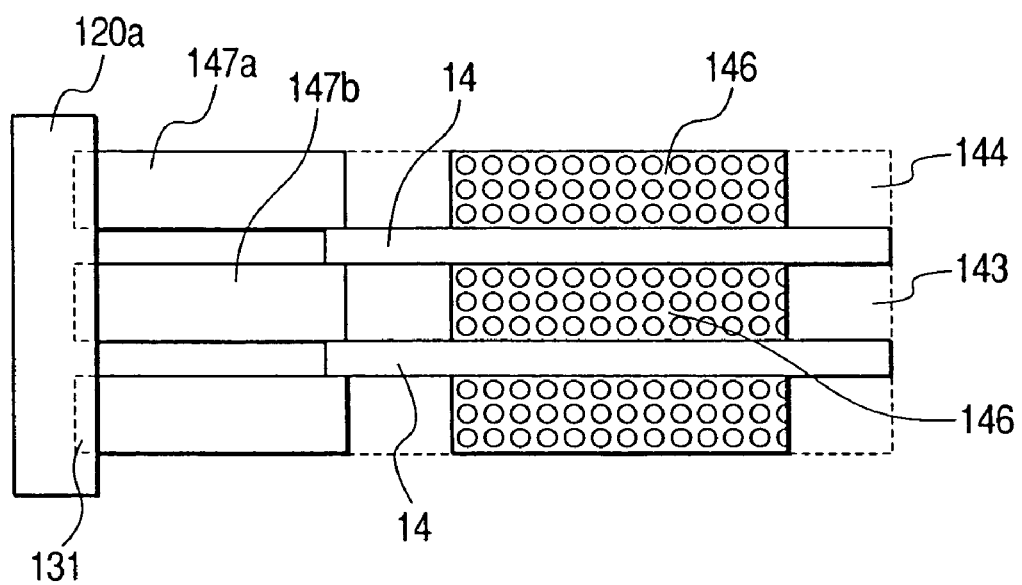
FIG. 26 is a diagram for explaining the positional relationship between cells, a circuit board and fuel electrode chamber partition walls in the case of a parallel connection of two cells.

FIG. 26 is a diagram for explaining the positional relationship among the fuel cells 14, a circuit board 120a, and supporting members 147a, each located at the end of an oxidizer electrode chamber, and a fuel electrode chamber partition wall 147b in the case of parallel connection of two fuel cells. Reference numeral 131 denotes an entry that is provided in a wiring member 120a and into which the supporting member 147a or partition wall 147b is inserted, 143 denotes a fuel electrode chamber, and 144 denotes an oxidizer electrode chamber. The partition wall 147b of the fuel electrode chamber and the supporting member 146 are inserted between two fuel cells 14. Furthermore, the supporting member 147a located at the end of an oxidizer electrode chamber and another supporting member 146 are provided in another face of a fuel cell 14. Each of the ends of two supporting members 147a and one partition wall 147b protrudes from fuel cells (protrudes from a space where two fuel cells surround), and is inserted into an entry 131 of the circuit board 120a.

In the seventh embodiment, conductive materials are used as the supporting member 147a of an oxidizer electrode chamber and the partition wall 147b of a fuel electrode chamber. The electric power generated in the fuel cells 14 is drawn off to the wiring member 120a through these supporting members 147a and partition wall 147b. Due to such a structure, the supporting members 147a located at the ends of the oxidizer electrode chambers and the partition wall 147b of the fuel electrode chamber can play the role of collecting the electric power generated in the fuel cells while preventing the contact of adjacent fuel cells. In addition, in order to prevent contact between the fuel electrode chamber partition wall 147b and the supporting members 147a at the ends of the oxidizer electrodes, insulating films may be provided therebetween.

Figure 27:
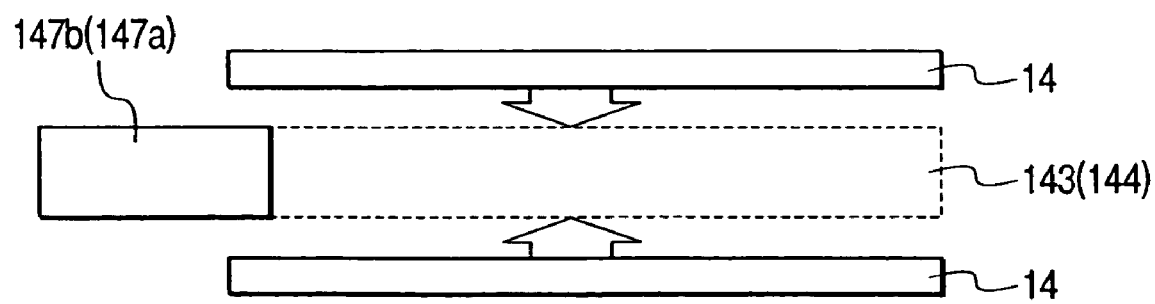
FIG. 27 is a diagram for explaining the positional relationship between cells and a conductive fuel electrode chamber partition wall which has a wiring function to a circuit board (in the case of parallel connection)

FIG. 27 is a diagram for explaining the positional relationship between fuel cells and a conductive fuel electrode chamber partition wall, which has a wiring function with respect to a circuit board (in the case of a parallel connection). The partition wall 147b of a fuel electrode chamber is provided between two fuel cells 14. The end of the partition wall 147b protrudes from a space surrounded by the two fuel cells. The fuel electrodes of two fuel cells 14 face each other, and the fuel electrode chamber 143 is formed in a space between the cells. Fuel flows to the inside of this fuel electrode chamber 143 and contributes to the electric power generation through the oxidizer electrode of the fuel cells 14. The electric power generated in the fuel cells 14 is drawn off through the partition wall 147b in contact with the fuel electrode of the fuel cells 14.

Figure 28A:
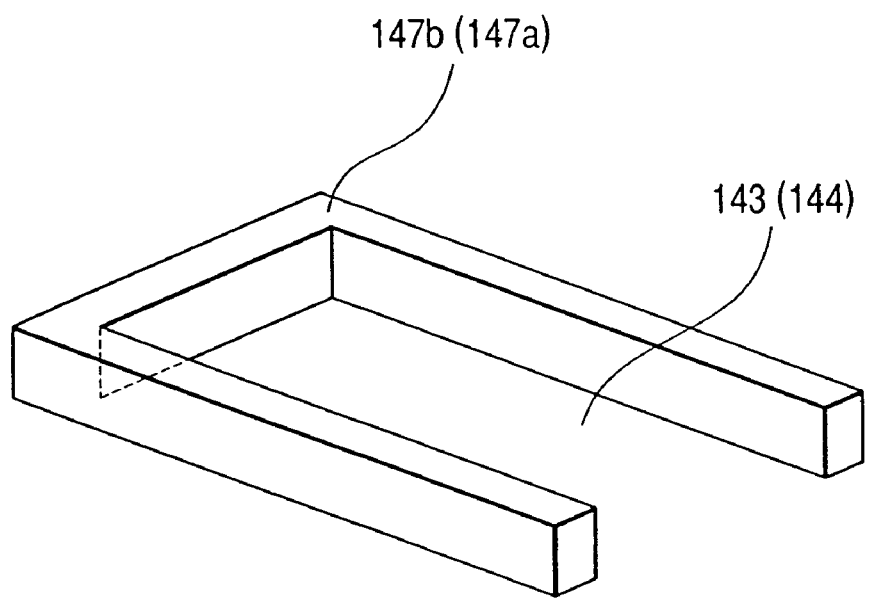
FIG. 28A is a perspective view of a fuel electrode chamber partition wall (or a supporting member located in an end of an oxidizer electrode chamber)
Figure 28B:
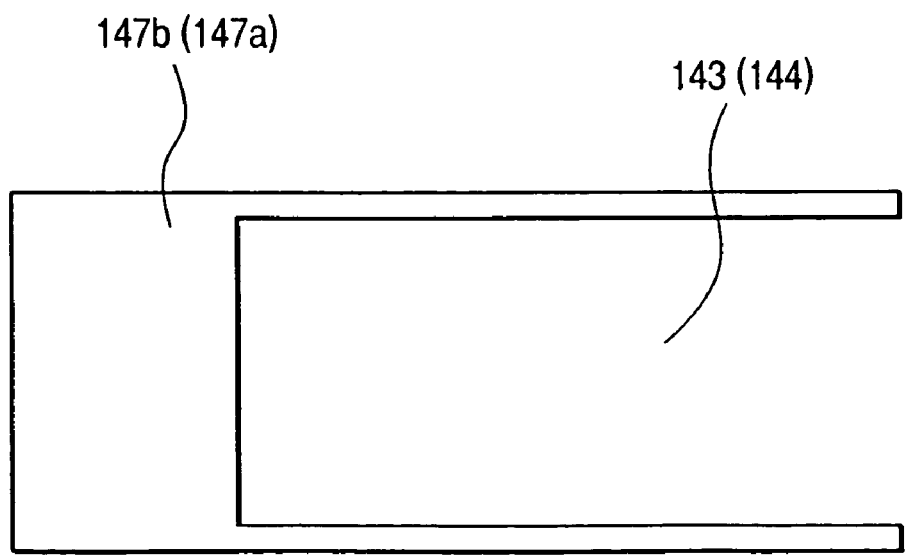
FIG. 28B is a plan view of FIG. 28A.

FIG. 28A is a perspective view of the fuel electrode chamber partition wall 147b (the supporting member 147a located at the end of the oxidizer electrode chamber). FIG. 28B is a plan view of FIG. 28A. The partition wall is U-shaped. A portion exactly corresponding to a portion of the bottom of the U-shape protrudes from a space between the fuel cells as shown in FIGS. 26 and 27. A region surrounded by two arms of the U-shape is a region used as the fuel electrode chamber 143 (oxidizer electrode 144) of the stack of the fuel cells.

Figure 29:
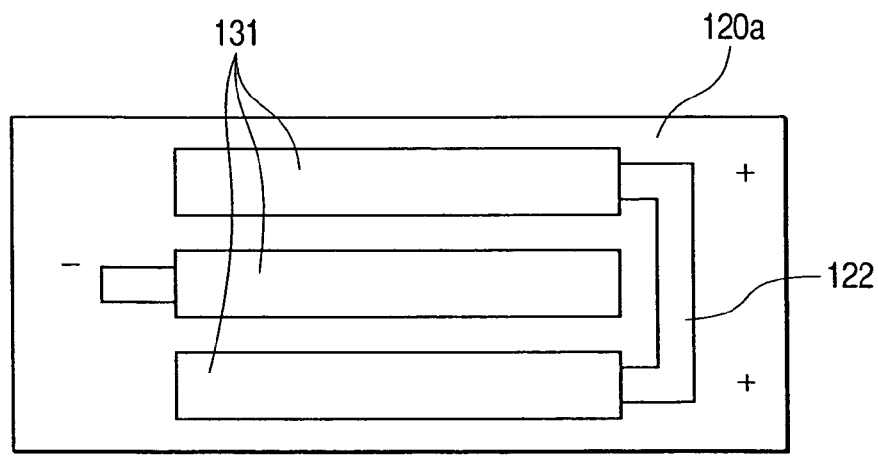
FIG. 29 is a diagram for explaining a circuit board and its wiring pattern for the parallel connection of two cells.

FIG. 29 is a diagram for explaining the circuit board 121a and its wiring pattern for the parallel connection of two fuel cells. The supporting members 147a located at the ends of two oxidizer electrode chambers and the partition wall 147b of a fuel electrode chamber are inserted into the entries 131, respectively. The top and bottom entries 131 are electrically connected by the wiring 22. As shown in FIG. 26, it is possible to electrically connect two fuel cells 14 in parallel by connecting the stack of fuel cells to the circuit board 121a.

Eighth Embodiment

The eighth embodiment differs from the seventh embodiment in that a partition wall having a joint with a circuit board, which is shifted from the center, is used.

Figure 30:
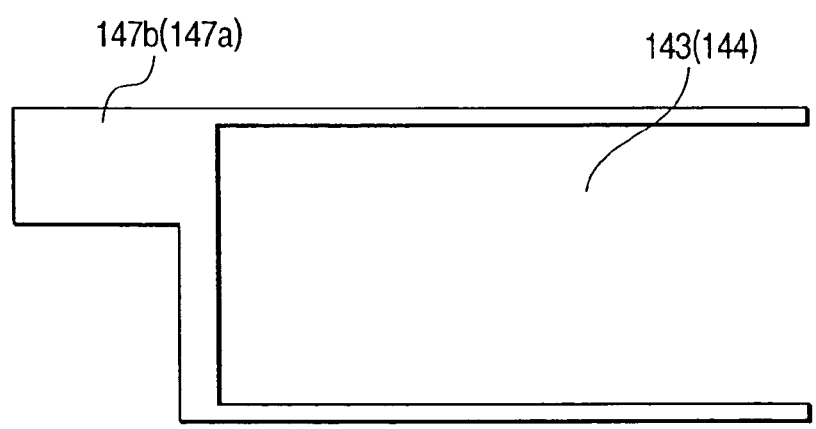
FIG. 30 is a perspective view of a fuel electrode chamber partition wall (or a supporting member located in an end of an oxidizer electrode chamber) having a connection section with a circuit board which is shifted from the center.

FIG. 30 is a plan view of a fuel electrode chamber partition wall 147b (a supporting member 147a located at the end of an oxidizer electrode chamber) having a joint with a circuit board, which is shifted from the center. This partition wall has the reverse "y" shape. It is possible to distribute the locations of joints of positive electrodes and joints of negative electrodes to the right and left, respectively, by reversing the orientation of supporting members 147a of the two oxidizer electrodes and one fuel electrode partition wall 146b.

Figure 31:
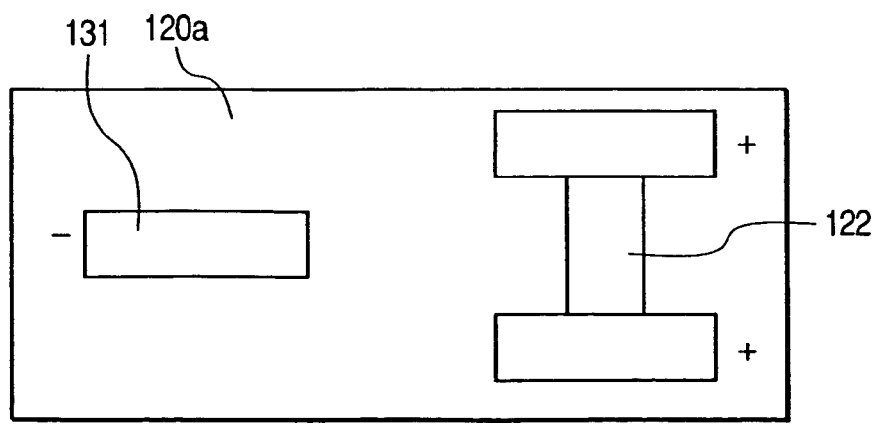
FIG. 31 is a diagram for explaining a circuit board and its wiring pattern in the case of using the partition wall in FIG. 30 (pattern of a parallel connection of two cells)

FIG. 31 is a diagram for explaining the circuit board 120a and its wiring pattern in the case of using the partition wall in FIG. 30 (this wiring pattern is a pattern of connecting two fuel cells in parallel). Two right-hand entries are electrically connected by the wiring 122. Since two supporting members 147a inserted into these two entries respectively have the same polarity, it is possible to connect two fuel cells 14 in parallel. In addition, in this example, the supporting members 147a (as a positive electrode) are inserted into two right-hand entries 131, and the partition wall 147b (as a negative electrode) is inserted into the left-hand entry 131. Since partition walls having the same polarity are arranged on the same side, distinguishing their polarity is easy, and a pattern of the wiring 122 is also simple.

In addition, although an electromotive force of each fuel cell is small at about 0.8 V, it is possible, by transforming it by using a DC-DC converter, etc., to output the optimal voltage for an electric device outside the fuel cell system.

Although the eighth embodiment is the case where there are two fuel cells, it is also possible to have a similar structure with four cells, as shown in FIGS. 30 and 31.

Figure 32:
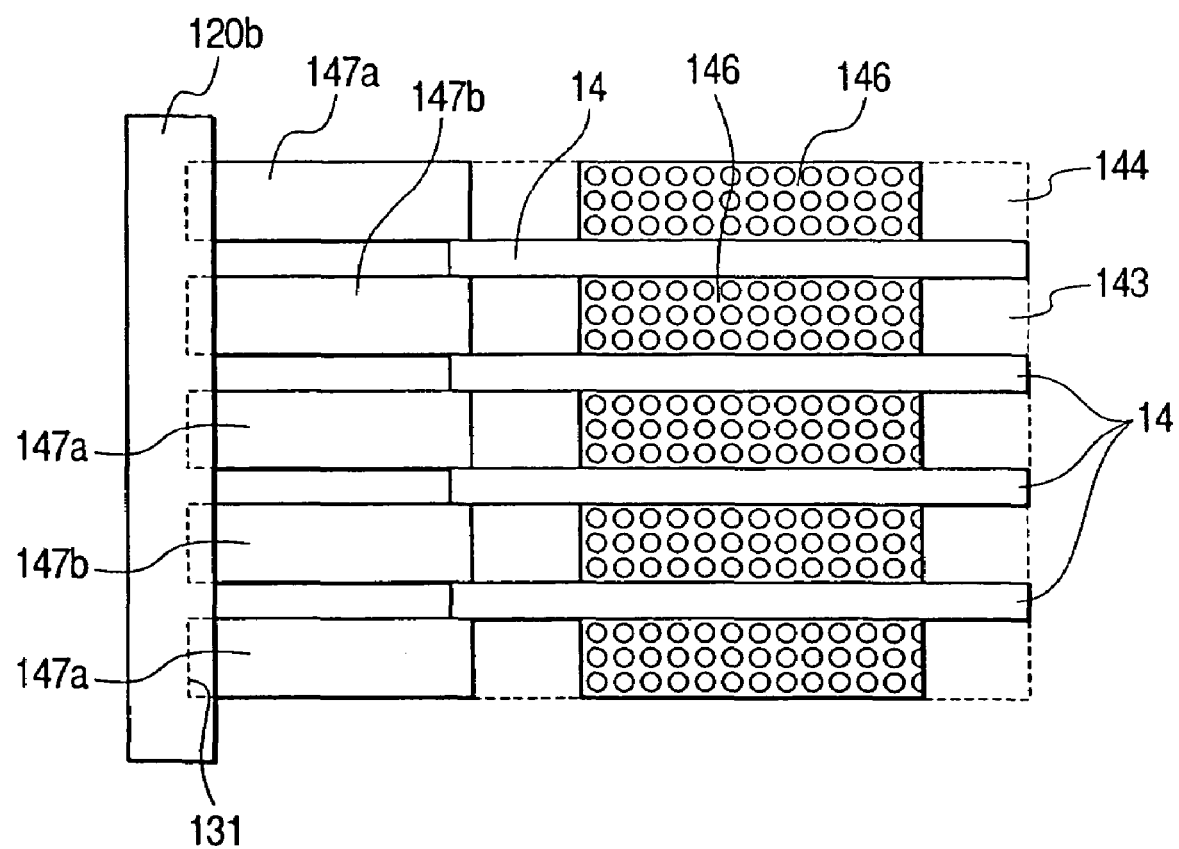
FIG. 32 is a diagram for explaining the positional relationship between cells, a circuit board and fuel electrode chamber partition walls in the case of parallel connection of four cells.

FIG. 32 is a diagram for explaining the positional relationship among fuel cells, a circuit board, supporting members located at the ends of oxidizer electrode chambers, and fuel electrode chamber partition walls in the case of a parallel connection of four fuel cells. Four fuel cells 14, three supporting members 147a, and partition walls 147b are arranged, in turn.

Figure 33:
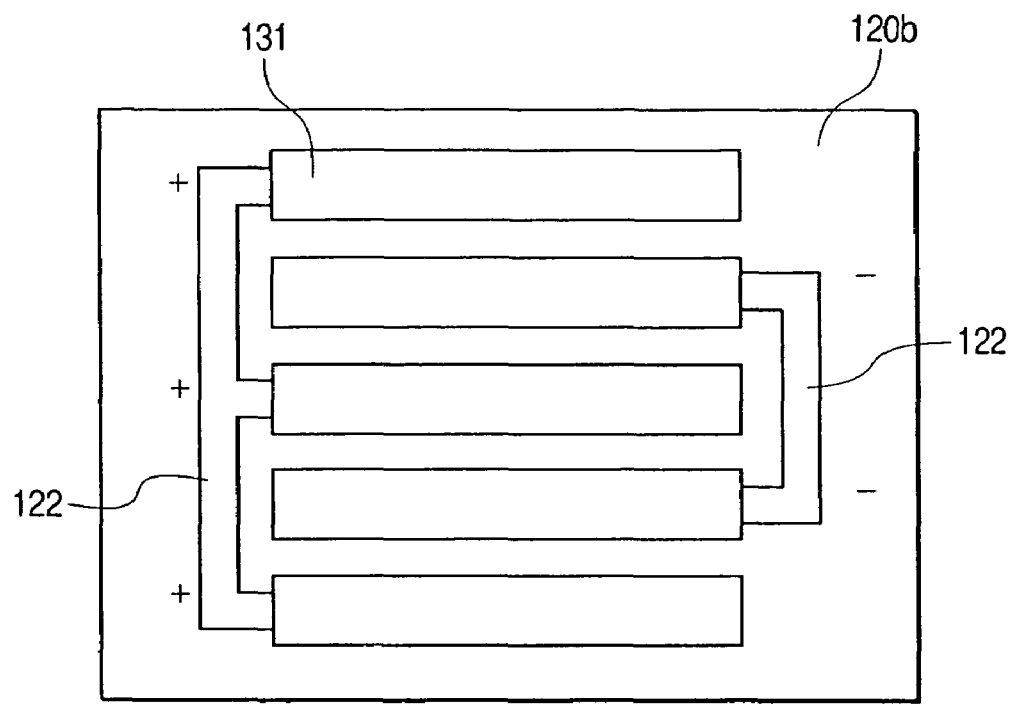
FIG. 33 is a diagram for explaining a circuit board and its wiring pattern for the parallel connection of four cells.

FIG. 33 is a diagram for explaining a circuit board and its wiring pattern for a parallel connection of four fuel cells. When U-shaped members shown in FIG. 28B are used as supporting members 147a and partition walls 147b, locations of entries 131 of the circuit board 120b corresponding to the ends of three supporting members 147a and the ends (portions of bottoms of U-shapes) of two partition walls 147b become a single column, as shown in FIG. 34.

Figure 34:
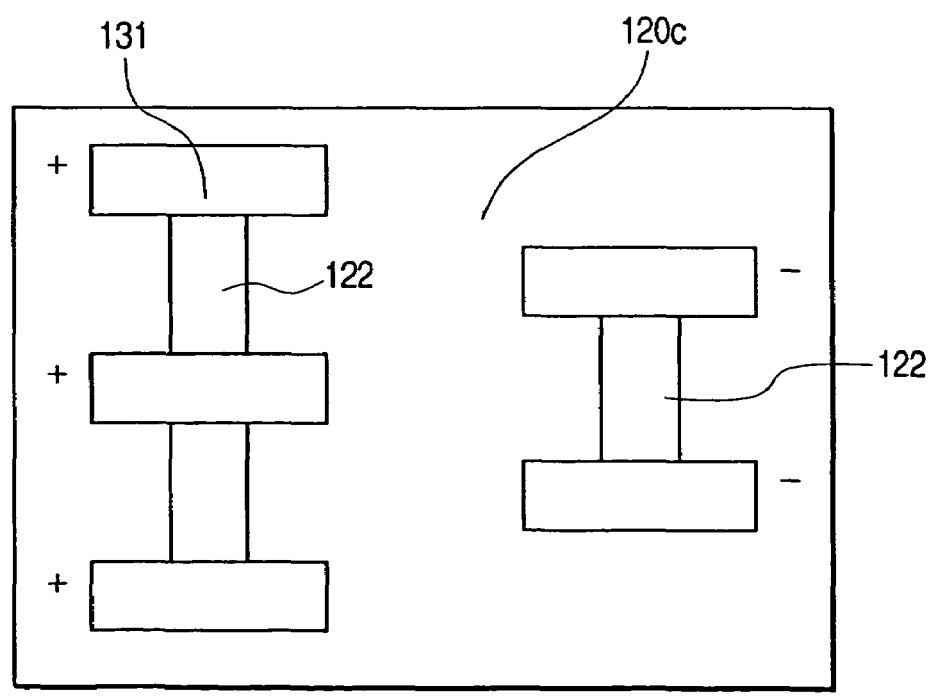
FIG. 34 is a diagram for explaining a circuit board and another wiring pattern for the parallel connection of four cells.

FIG. 34 is a diagram for explaining another circuit board for a parallel connection of four fuel cells and its wiring pattern. The first, third, and fifth steps of entries 131 from the top are electrically connected by the wiring 122. The second and fourth steps of entries 131 from the top are electrically connected. Due to such structure, it is possible to easily connect five fuel cells 14 in parallel.

When the inverse "y"-type partition walls shown in FIG. 30 are used instead of the partition walls 147b (or supporting members 147a) shown in FIG. 28B, as for the locations of entries 131 of the circuit board 120c corresponding to the ends of supporting members 147a, and the ends (portions of toes of "y") of partition walls 147b, as shown in FIG. 34, entries with the same polarities are distributed to the right side and left side, respectively. In this example, right-hand entries are used for the negative electrodes and left-hand entries are used for the positive electrodes.

Ninth Embodiment

The ninth embodiment differs from the eighth embodiment in that fuel cells are connected in series rather than in parallel.

Figure 35:
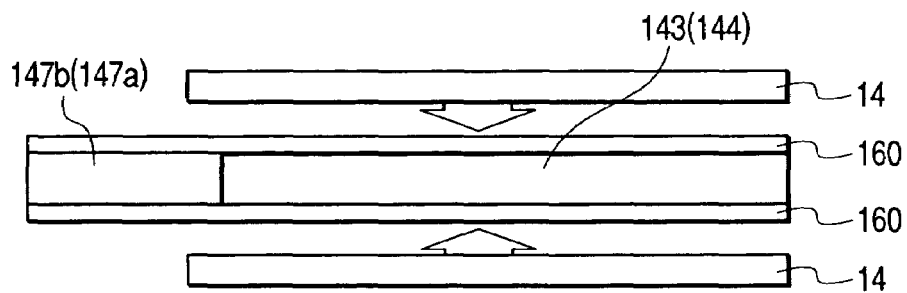
FIG. 35 is a diagram for explaining the positional relation of cells, insulating fuel electrode partition walls, and conductive plates.

FIG. 35 is a diagram for explaining the positional relationship among fuel cells, an insulating fuel electrode partition wall, and conductive members.

Figure 36:
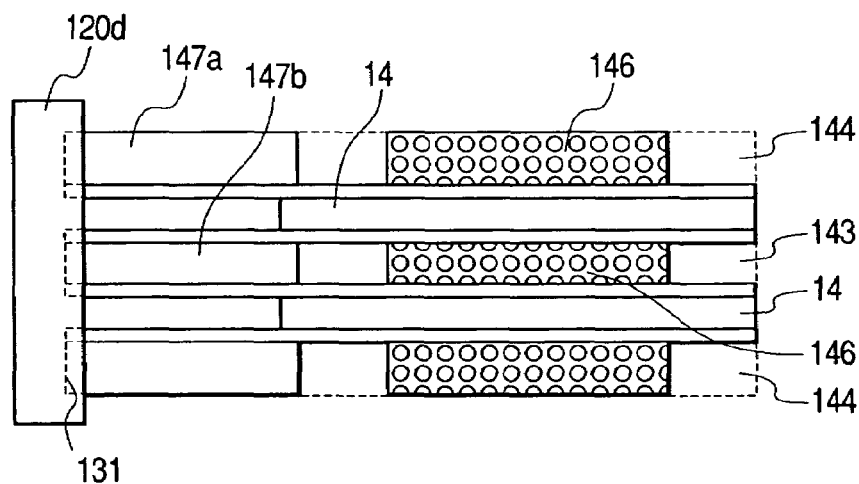
FIG. 36 is a diagram for explaining the positional relationship between cells, a circuit board and fuel electrode chamber partition walls in the case of two cells connected in series.

FIG. 36 is a diagram for explaining the positional relationship among fuel cells, a circuit board and fuel electrode chamber partition walls when two fuel cells are connected in series. In the ninth embodiment, in order to insulate two fuel cells 14 that face each other by sandwiching the fuel electrode chamber partition wall 147b between the cells, the partition wall 147b has an insulating property. In order to draw off the electric power generated in fuel cells 14, a conductive member 160 is provided between the fuel cell 14 and a partition wall 147b. Electric power is drawn off through this conductive member 160. Here, an insulating material is also used as a supporting member 147a located at the end of an oxidizer electrode chamber.

Figure 37:
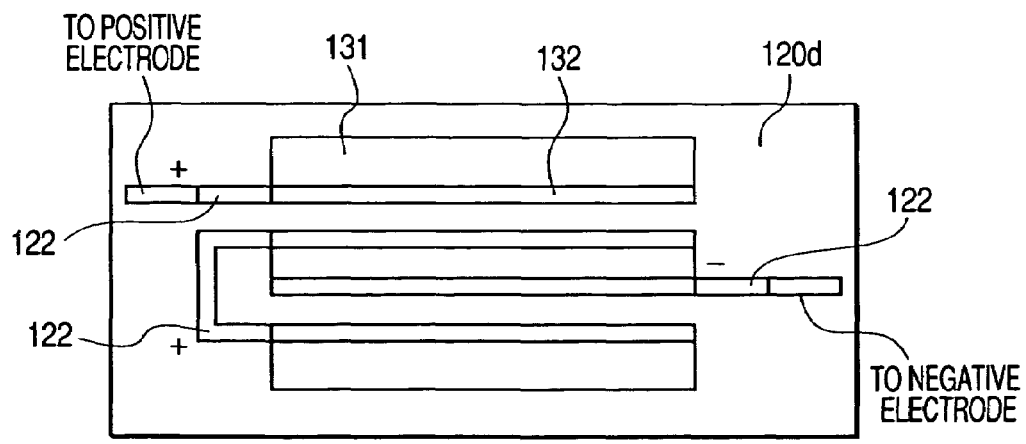
FIG. 37 is a diagram for explaining a circuit board and its wiring pattern for the series connection of two cells.

FIG. 37 is a diagram for explaining a circuit board and its wiring pattern when two fuel cells are connected in series. Reference numeral 132 denotes an entry of a conductive member. When a stack of cells is constituted by using the insulating partition walls 147b and supporting members 147a, which are shown in FIG. 36, and these are joined with the circuit board 120d, the resulting structure is as shown in FIG. 37. Since an upper fuel cell 14 and a lower fuel cell 14 are insulated, electric power is drawn off from a fuel electrode and an oxidizer electrode of each fuel cell 14 through conductive members 160, which are in contact with these electrode, respectively. Since fuel electrodes of respective fuel cells are insulated from each other, it is possible to connect the positive electrode of one fuel cell 14 and the negative electrode of another fuel cell with the wiring 122. As a result, it is possible to connect two fuel cells 14 in series.

Figure 38:
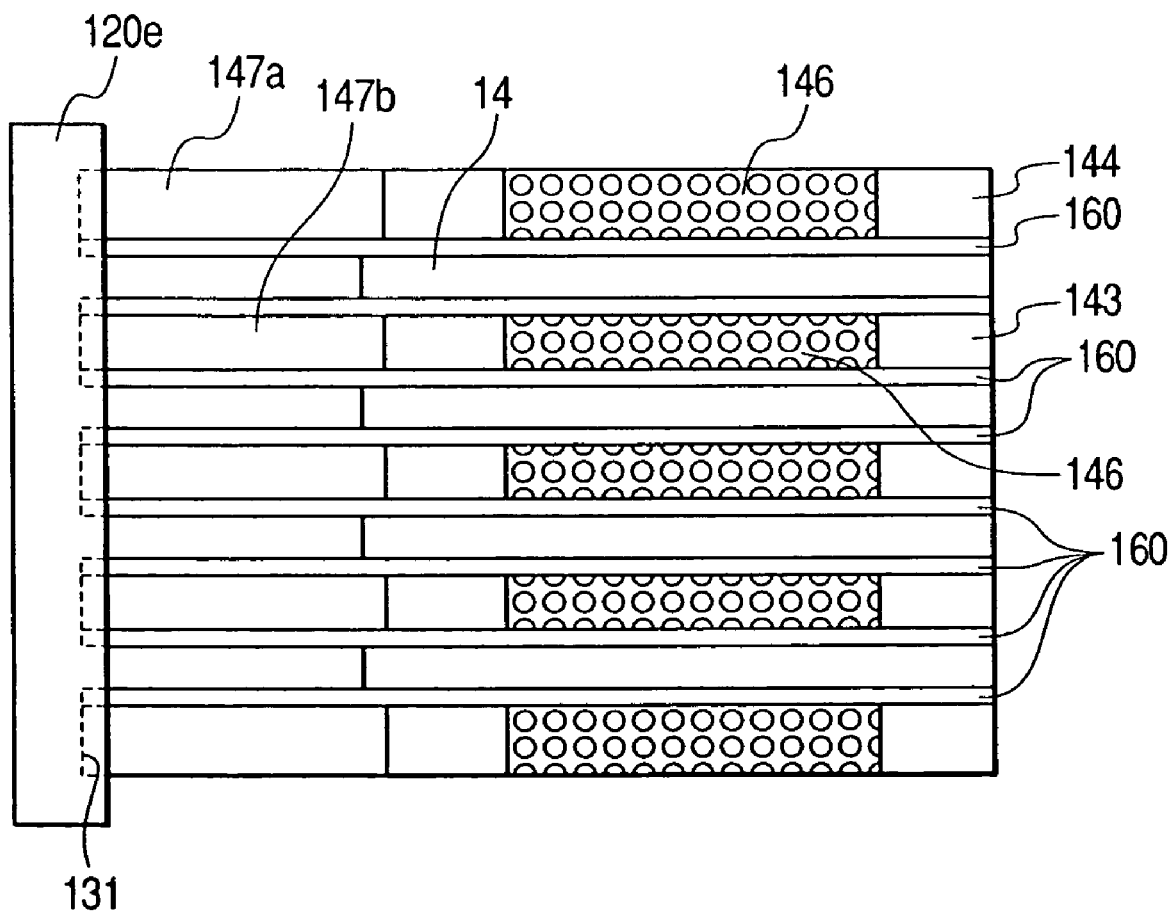
FIG. 38 is a diagram for explaining the positional relationship between cells, a circuit board and fuel electrode chamber partition walls in the case of four cells connected in series.
Figure 39:
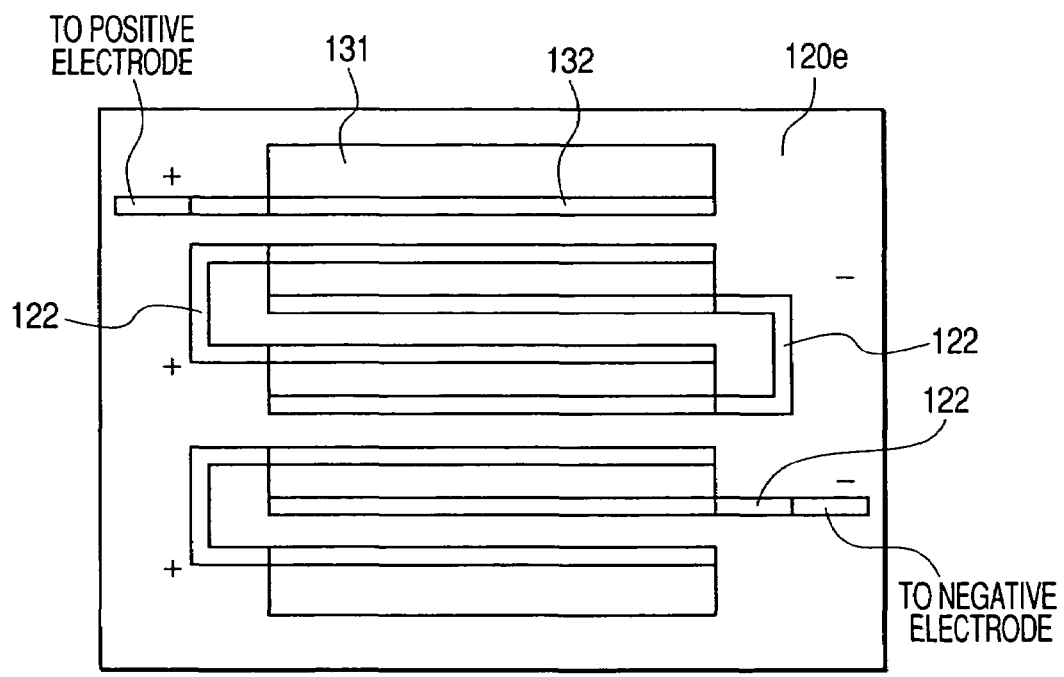
FIG. 39 is a diagram for explaining a circuit board and its wiring pattern for the connection of four cells in series.

Moreover, although the case in which two fuel cells are used is explained above, it is possible to connect four fuel cells in the same manner, as shown in FIGS. 38 and 39.

FIG. 38 is a diagram for explaining the positional relationship among fuel cells, a circuit board 120e, supporting members 147a and fuel electrode chamber partition walls 146a when four fuel cells are connected in series. Four fuel cells 14, three supporting members 147a, and two partition walls 147b are stacked in turn. A conductive member 160 is provided between each fuel cell 14 and a supporting member 147a or a partition wall 147b. The supporting members and partition walls are inserted into the entries 131 of the circuit board 120e, respectively.

FIG. 39 is a diagram for explaining a circuit board and its wiring pattern of four fuel cells connected in series. Corresponding to three supporting members 147a and two partition walls 147b of the stacked body of cells, which are shown in FIG. 38, the entries 131 and conductive member entries 132 are provided. Since electrodes of adjacent fuel cells 14 facing each other are mutually insulated, it is possible to connect five fuel cells 14 in series as shown in FIG. 39 by connecting the positive electrode of one fuel cell to the negative electrode of another, adjacent fuel cell.

Figure 40:
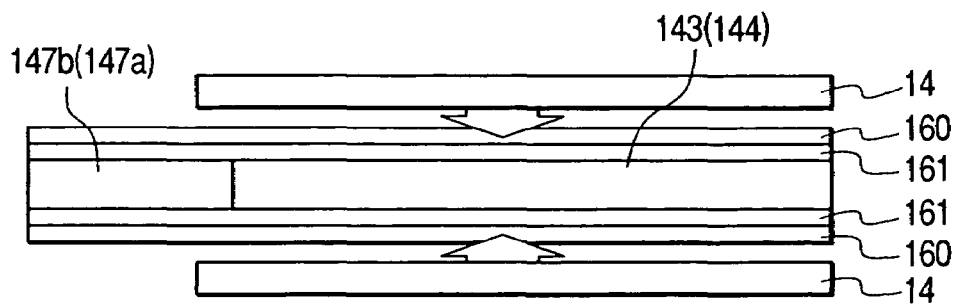
FIG. 40 is a diagram for explaining the positional relationship of cells, conductive fuel electrode partition walls, insulating plates and conductive plates.

In addition, even when the supporting members 147a and partition walls 147b are not insulated but are electroconductive, it is possible to insulate adjacent fuel cells from each other by making the structure as shown in FIG. 40. FIG. 40 is a diagram for explaining the positional relationship among fuel cells, electroconductive support members located at the ends of oxidizer electrode chambers, fuel electrode partition walls insulating members and conductive members. Reference numeral 161 denotes an insulating member. The insulating member 161 is provided between a conductive supporting member 147a or a conductive partition wall 147b and a fuel cell 14, and the conductive member 161 is provided between an insulating member 161 and a fuel cell 14. It is possible to insulate the two fuel cells 14 from each other, and to draw off the electric power generated in the fuel cells to the outside through conductive members 160. The insulating member 161 can be formed on the surfaces of a supporting member 147a and a partition wall 147b by, for example, an applying or coating method. The conductive member can be formed by applying, coating, evaporation, etc., on the supporting member and an insulating member 160 of the partition wall.

Tenth Embodiment

The tenth embodiment is related to preventing two fuel cells, which face each other such that oxidizer electrodes counter each other, from becoming conductive with the water generated in the oxidizer electrode.

Figure 41:
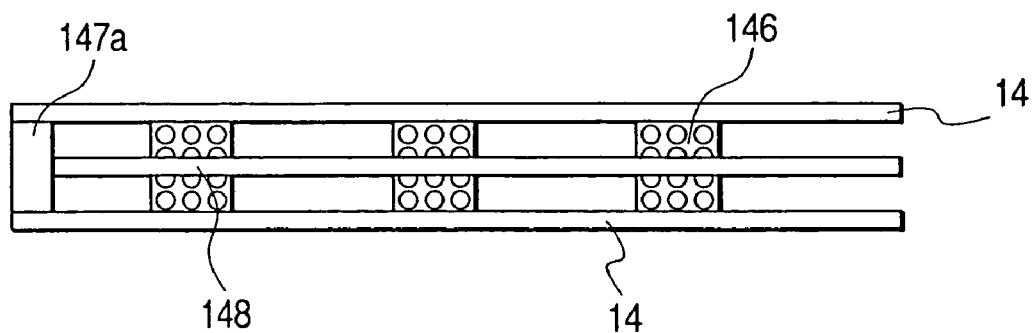
FIG. 41 is a structural diagram of a cell unit having a water shutoff member between two cells.

FIG. 41 is a structural diagram of the cell unit of the fuel cell system, which has a water shutoff member between two fuel cells. Reference numeral 148 denotes a member that shuts off the water generated in the oxidizer electrode. A plurality of supporting members 146 are provided between the cells, which counter each other, with the oxidizer electrodes of the cells facing each other and sandwiching a supporting member 147a located at the end of the oxidizer electrode. Water cutoff means is provided among the plurality of supporting members 146. It is possible to prevent the movement of the water generated in an oxidizer electrode of one cell to an opposite cell by the water cutoff means. In particular, as such a member, a gas liquid separation film, etc., is suitable from the viewpoint of not disturbing the supply of air.

Figure 42:
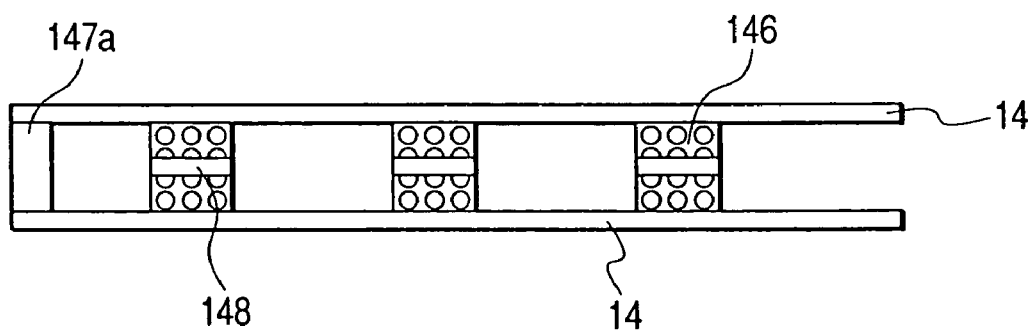
FIG. 42 is a structural diagram of a cell unit having water shutoff members in supporting members.
Figure 43:
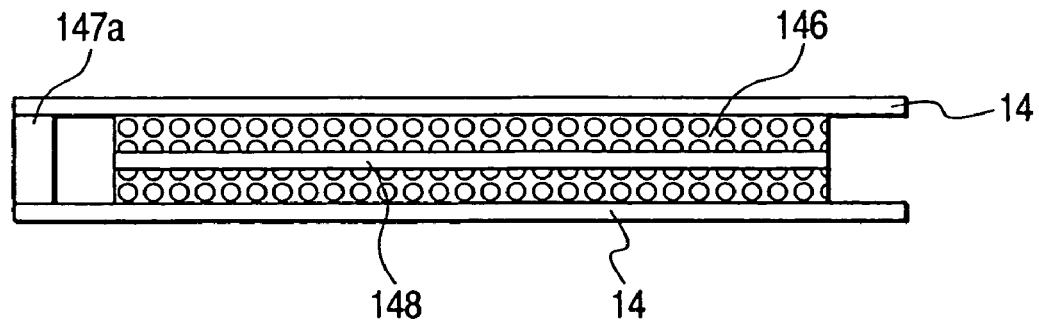
FIG. 43 is a structural diagram of a cell unit having a water shutoff member in a supporting member.

In addition, as a modified example of the water cutoff means, means having a water shutoff member in the supporting member 146, as shown in FIGS. 42 and 43, can be used.

Moreover, a method of using a hydrophobic member as a supporting member 146 can be employed for shutting off the water. Furthermore, a method of using a member made of a hydrophobic porous material as the supporting member 146, in which the surface areas of a porous material in the center section of the supporting member are large, can be employed. As methods of increasing the surface areas, a method of increasing the density of holes without changing the dimensions of the holes and a method of making the dimensions of the holes small to increase their number can be employed.

INDUSTRIAL APPLICABILITY

As explained above, according to the first aspect of the present invention, since the arrangement relationship of respective units constituting a fuel cell system is specified, it is possible to provide a large-capacity and high-output fuel cell system, which is mountable in a small and portable electric device, and is miniaturized. Moreover, it is possible to provide a fuel cell system in which only a fuel tank cartridge can be exchanged.

As explained above, according to the second aspect of the present invention, it is possible to provide a fuel cell system in which fuel is efficiently supplied to fuel cells and in which a plurality of fuel cells are made compact by broadening the fuel flow paths by stacking respective fuel cells so that the fuel electrodes of the cells face each other and the oxidizer electrodes face each other, respectively, and providing a common fuel flow path and a common oxidizer flow path between fuel cells.

Moreover, by using the fuel cell system of the present invention, it is possible to provide a portable and small electric device, such as a digital camera, a digital video camera, a small projector, a small printer, a notebook sized personal computer, or the like.

The invention claimed is:

1. A fuel cell system which is mounted in and used for a portable and small electric device, comprising:
   a thin housing having a substantially rectangular parallelepiped shape;
   a cell unit comprising one or more fuel cells;
   a fuel tank unit for storing a fuel to be supplied to the cell unit; and
   a fuel feed unit for supplying the fuel from the fuel tank unit to the cell unit, the fuel feed unit, the fuel tank unit and the cell unit being provided in the housing,
   wherein the fuel tank unit, the fuel feed unit and the cell unit are located in order of i) the fuel tank unit, ii) the fuel feed unit, and iii) the cell unit in one direction between two opposite faces of the housing,
   wherein the fuel tank unit comprises a valve, which supplies fuel to the fuel feed unit and opens to release the fuel in the fuel cell system only when the fuel tank unit is mounted, and
   wherein the fuel feed unit connects sides of the fuel tank unit and the cell unit that face each other and reduces a pressure of gaseous fuel supplied from the fuel tank unit.

2. The fuel cell system according to claim 1, wherein the fuel tank unit, the fuel feed unit and the cell unit are located in order of i) the fuel tank unit, ii) the fuel feed unit, and iii) the cell unit in one direction between two opposite side faces of the housing.

3. The fuel cell system according to claim 2, wherein the fuel tank unit, the fuel feed unit and the cell unit are located in this order between the two opposite side faces.

4. The fuel cell system according to claim 2, wherein the one or more fuel cells of the cell unit are stacked parallel to a bottom face of the housing.

5. The fuel cell system according to claim 1, wherein the fuel tank unit, the fuel feed unit and the cell unit are located in order of i) the fuel tank unit, ii) the fuel feed unit, and iii) the cell unit in one direction between a top face and a bottom face of the housing.

6. The fuel cell system according to claim 5, wherein the cell unit faces and is located parallel to at least one of a top face and a bottom face of the housing.

7. The fuel cell system according to claim 5, wherein the cell unit, the fuel feed unit, the fuel tank unit, another fuel feed unit and another cell unit are located in this order between the top face and the bottom face.

8. The fuel cell system according to claim 1, wherein the housing has an opening for supplying an oxidizer gas.

9. The fuel cell system according to claim 8, wherein the housing comprises a portion that contains a cell unit and a portion that contains the fuel tank unit and the opening is at least in the portion of the housing that contains the cell unit.

10. The fuel cell system according to claim 8, wherein the opening is provided in a top face, a bottom face and a side face of the housing.

11. The fuel cell system according to claim 1, further comprising a wiring unit for collecting generated power and supplying it to the outside of the fuel cell, and wherein the wiring unit is provided at a location where the fuel tank unit does not exist.

12. The fuel cell system according to claim 1, wherein the fuel tank unit is provided detachably from the housing.

* * * * *